United States Patent
Bayley et al.

(10) Patent No.: US 10,929,928 B2
(45) Date of Patent: Feb. 23, 2021

(54) DETECTION SYSTEM FOR ANALYZING CRASH EVENTS AND METHODS OF THE SAME

(71) Applicant: Gulfstream Telematics LLC, Fort Collins, CO (US)

(72) Inventors: Gregory S. Bayley, Fairhope, AL (US); Peter F. Byrne, Fort Collins, CO (US); Jeffrey A. Jenkins, Shelby Township, MI (US)

(73) Assignee: Gulfstream Telematics LLC, Fort Collins, CO (US)

(*) Notice: Subject to any disclaimer, the term of this patent is extended or adjusted under 35 U.S.C. 154(b) by 351 days.

(21) Appl. No.: 15/935,623

(22) Filed: Mar. 26, 2018

(65) Prior Publication Data

US 2018/0285974 A1  Oct. 4, 2018

Related U.S. Application Data

(63) Continuation of application No. 14/548,671, filed on Nov. 20, 2014, now abandoned.
(Continued)

(51) Int. Cl.
*G06Q 40/04* (2012.01)
*B60R 21/0136* (2006.01)
(Continued)

(52) U.S. Cl.
CPC ......... *G06Q 40/04* (2013.01); *B60R 21/0136* (2013.01); *B60R 21/013* (2013.01);
(Continued)

(58) Field of Classification Search
CPC .. B60R 2021/0027; B60R 2021/01013; B60R 21/013; B60R 21/0173
See application file for complete search history.

(56) References Cited

U.S. PATENT DOCUMENTS

| | | | | |
|---|---|---|---|---|
| 4,908,767 A | * | 3/1990 | Scholl ................... | G01P 15/08 701/505 |
| 5,546,307 A | * | 8/1996 | Mazur ................. | B60R 21/0133 180/274 |

(Continued)

FOREIGN PATENT DOCUMENTS

DE  102012107186 A1 *  2/2014  ......... B60R 21/0132

*Primary Examiner* — Thomas G Black
*Assistant Examiner* — Sara J Lewandroski
(74) *Attorney, Agent, or Firm* — Brownstein Hyatt Farber Schreck, LLP

(57) ABSTRACT

Method for analyzing a crash event. The method may comprise receiving an acceleration of a vehicle over a predetermined length of time, the vehicle involved in the crash event, determining a change in velocity of the vehicle based on the acceleration, determining vehicle information relating to the vehicle involved in the crash event, and estimating a damage cost for the vehicle involved in the crash event, and/or estimating injuries to occupant(s) of the vehicle involved in the crash event. Estimating damage cost(s) may include determining crash force information for the vehicle, determining physical-damage characteristics of the vehicle subsequent to the crash event, and calculating the estimated damage cost to the vehicle. Estimating injuries to the occupant(s) may include determining occupant information relating to the occupant of the vehicle, calculating estimated forces exerted on the occupant, and calculating an injury probability for various body portions for the occupant.

12 Claims, 16 Drawing Sheets

Related U.S. Application Data

(60) Provisional application No. 61/907,799, filed on Nov. 22, 2013.

(51) Int. Cl.
  *B60R 21/00* (2006.01)
  *B60R 21/015* (2006.01)
  *B60R 21/013* (2006.01)

(52) U.S. Cl.
  CPC ..... *B60R 21/0156* (2014.10); *B60R 21/01558* (2014.10); *B60R 21/01562* (2014.10); *B60R 2021/0027* (2013.01)

(56) References Cited

U.S. PATENT DOCUMENTS

| | | | | |
|---|---|---|---|---|
| 6,076,028 | A * | 6/2000 | Donnelly | B60R 21/013 701/45 |
| 6,529,810 | B2 * | 3/2003 | Foo | B60R 21/013 180/271 |
| 6,776,435 | B2 * | 8/2004 | Foo | B60R 21/0136 280/735 |
| 6,885,981 | B2 * | 4/2005 | Bomar, Jr. | G06Q 99/00 702/142 |
| 8,118,130 | B2 * | 2/2012 | Foo | B60R 21/0132 180/274 |
| 9,654,679 | B1 * | 5/2017 | Veliche | H04N 5/23203 |
| 2002/0103622 | A1 * | 8/2002 | Burge | G06F 19/00 702/183 |
| 2008/0147267 | A1 * | 6/2008 | Plante | G07C 5/008 701/33.4 |
| 2008/0201038 | A1 * | 8/2008 | Jung | B60T 8/172 701/41 |
| 2008/0306996 | A1 * | 12/2008 | McClellan | G06Q 10/06 |
| 2009/0051510 | A1 * | 2/2009 | Follmer | G07C 5/0808 340/425.5 |
| 2010/0070140 | A1 * | 3/2010 | Chen | B60R 21/00 701/45 |
| 2011/0202241 | A1 * | 8/2011 | Le | B60R 21/0134 701/46 |
| 2011/0279263 | A1 * | 11/2011 | Rodkey | G08B 25/002 340/539.13 |
| 2012/0089299 | A1 * | 4/2012 | Breed | B60N 2/888 701/36 |
| 2012/0150483 | A1 * | 6/2012 | Vock | A61B 5/6807 702/141 |
| 2013/0274995 | A1 * | 10/2013 | Kim | B62J 27/00 701/36 |
| 2013/0338851 | A1 * | 12/2013 | Lynch | B60R 21/00 701/1 |
| 2015/0112543 | A1 * | 4/2015 | Binion | G06T 13/80 701/32.2 |
| 2015/0112545 | A1 * | 4/2015 | Binion | G07C 5/0891 701/33.4 |
| 2015/0274108 | A1 * | 10/2015 | Iguchi | B60R 21/0132 280/729 |
| 2016/0140781 | A1 * | 5/2016 | Lang | G07C 5/08 701/33.7 |
| 2016/0144817 | A1 * | 5/2016 | Chambers | G08G 1/205 340/436 |
| 2016/0152211 | A1 * | 6/2016 | Owens | B60R 25/31 348/36 |

\* cited by examiner

VEHICLE DETAILS

| | |
|---|---|
| REGION: | SOUTH AFRICA |
| MAKE: | VOLKSWAGEN |
| MODEL: | POLO |
| CLASS: | MINI |
| YEAR: | 2013 |

CRASH EVENT DETAILS

| | |
|---|---|
| CASE ID: | 222769 |
| PRE CRASH SPEED (MPH): | 35 MPH |
| CRASH DATE: | 10/21/2014 |
| CRASH TIME: | 06:06 PM |
| CRASH LATITUDE: | -26.0632236 |
| CRASH LONGITUDE: | 27.940505099999996 |
| ADDRESS: | THE COCA-COLA DOME CORNER NORTHUMBERLAND AND OLIEVENHOUT AVE, NORTH RIDING, JOHANNESBURG SOUTH AFRICA |

COLLISION COST FORECAST

| | |
|---|---|
| DISPLACEMENT: | 25.0' CRUSH |
| PDOF: | 0 DEGREES |
| SEVERITY: | VERY HEAVY |
| COLLISION REPAIR COST PREDICTION: | R $2,000 |

BILL OF MATERIALS (PRELIMINARY ESTIMATE)

| COMPONENT DESCRIPTION | COUNT (NUMBER OF PARTS) |
|---|---|
| BUMPER COVER | 1 |
| LAMP ASSYS | 2 |
| BUMPER REBAR | 1 |
| HOOD | 1 |
| FENDERS | 2 |
| GRILL | 1 |
| RADIATOR | 1 |
| DAB | 1 |
| PAB | 1 |
| SEAT BELT WITH D-RING | 1 |
| CLOCKSPRING | 1 |
| ECU | 1 |
| FRONT WHEELS | 2 |
| FRONT TIRES | 2 |
| CORNER ASSYS | 2 |
| STEERING COLUMN | 1 |
| KNEE BOLSTER | 1 |
| INSTRUMENT PANEL | 1 |
| WINDSHIELD | 1 |
| FRAME STRAIGHTENING | 1 |

CRASH MAP LOCATION

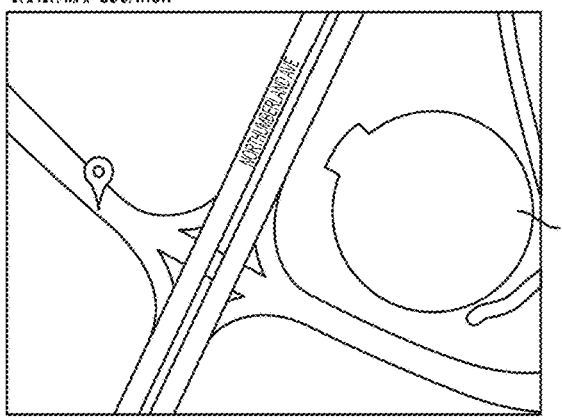

PHOTO OF SIMILAR VEHICLE WITH SAME SEVERITY OF DAMAGE

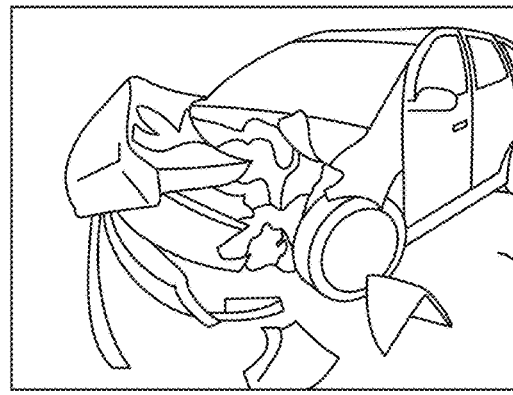

PDOF (PRIMARY DIRECTION OF FORCE)

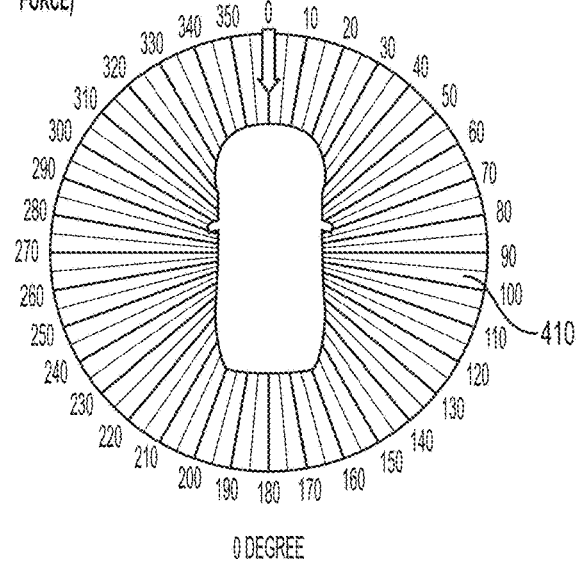

| BILL OF MATERIALS | | | |
|---|---|---|---|
| Parts | Parts Count | Repair Cost (Est.) | Replacement Cost (Est.) |
| Bumper | 1 | $500 | |
| Headlights | 2 | | $150 |
| Grill | 1 | $100 | $200 |
| Fan | 1 | $75 | |
| TOTAL | 5 | $675 | $350 |

FIG. 8

| Total Loss Indicator ||||| 
|---|---|---|---|---|
| Case Number | Vehicle VIN | Estimated Cost to Repair to Pre-Crash Condition | Actual Cash Value ("ACV") of the Vehicle | Probability of Total Loss or Write Off |
| 565484444 | 1JPLX25HYIO566899 | $3500 | $5800 | 80% |

⌐700

|  |  | p(AIS≥2) | p(AIS≥3) | p(AIS≥4) | p(AIS≥5) |
|---|---|---|---|---|---|
| HEAD |  |  |  |  |  |
| HIC15 | 85.4 |  |  | 0.88% |  |
| HIC36 | 85.4 |  |  | 0.88% |  |
| NECK |  |  |  |  |  |
| NTE | 1.27 |  | 32.60% |  | 9.12% |
| NTF | 1.821 |  | 58.87% |  | 16.23% |
| NCE | 1.018 |  | 22.75% |  | 6.91% |
| NCF | 0.894 |  | 18.74% |  | 6.02% |
| CHEST |  |  |  |  |  |
| Chest Accel (3ms clip g) | 30.14577 |  | 22.27% |  | 0.11% |
| LOWER EXTREMITIES |  |  |  |  |  |
| L Femur Load (kN) | 1.9564 | 0.83% |  |  |  |
| R Femur Load (kN) | 0.9895 | 0.51% |  |  |  |

| Occupant Body Region | Likelihood of Injury |
|---|---|
| Head | Very Low |
| Neck | High |
| Chest | Moderate |
| Lower Extremities | Low |

FIG. 11B

DETECTION SYSTEM FOR ANALYZING CRASH EVENTS AND METHODS OF THE SAME

CROSS-REFERENCE TO RELATED APPLICATIONS

This application is a continuation patent application of U.S. patent application Ser. No. 14/548,671, filed Nov. 20, 2014 and titled "Detection System for Analyzing Crash Events and Methods of the Same," which is a nonprovisional patent application of and claims the benefit to U.S. Provisional Patent Application No. 61/907,799, filed Nov. 22, 2013 and titled "An Electronic System that Reports Estimated Injury and Repair Parameters in a Vehicle Crash," the disclosures of which are hereby incorporated herein by reference in their entireties.

TECHNICAL FIELD

The disclosure relates generally to a detection system for a vehicle involved in a crash event. More particularly the disclosure relates to a system and a method for analyzing a crash event involving a vehicle, including estimating a damage cost to the vehicle and estimating injuries to the occupant of the vehicle involved in the crash event.

BACKGROUND

Vehicles, such as personal automobiles, motorcycles and/or construction vehicles, may be insured in case of damage and/or destruction typically caused in a crash event (e.g., car accident). The conventional insurance policy on a vehicle may be based on vehicle specific information (e.g., type of vehicle, make, model and so on), and operator information (e.g., age, occupation driving history, and the like). In the event of a crash event, insurance companies typically receive a claims, or information relating to the crash event involving the insured vehicle. Once reviewed and/or assessed, the insurance company may issue funds and/or provide a subsidized bill to cover repairs to the vehicle. Additionally, funds may be issued to the insured or occupant of the vehicle to compensate for the personal or medical expenses associated with the bodily injuries sustained in the crash event.

With the minimal information provided in these claims, an actual insurance adjuster is usually required to do a review of the vehicle in person and/or discuss the damage to the vehicle involved in the crash event with a mechanic. As a result, conventional insurance policies take days, or even weeks to complete the review of, and assess the claim. Additionally, where an adjuster needs to review the vehicle damage in person, it may not be determined that the vehicle is a total loss or non-repairable until after multiple days have passed and the owner and/or the insurer of the vehicle has incurred multiple expenses, such as towing expenses and mechanic assessment expenses.

For many years, property and casualty insurers have relied, and continue to rely on the policyholder making a phone call to a toll free number informing the insurer of the collision event and the likelihood of a claim. This notice to the insurer, known as "first notice of loss" (FNOL), is the formal commencement of the claims process, and marks the beginning of the limited window of time during which licensed insurers are expected to complete the vehicle repair, and close the claim file. The insurer must make a decision during the call from the policy holder how to treat the vehicle. The decision typically involves deciding whether the vehicle should be sent directly to a salvage auction (i.e. a total loss or a write off), or should be sent to a collision repair shop. Without any real time technical data on the crash event, the call center employee typically will ask the policyholder, "how hard was the crash", or "is the vehicle drivable". These questions are typical of the current practice in the auto insurance industry worldwide, and are inexact, as the policy holder, is usually not well placed to determine whether the vehicle is drivable or not.

New insurance policies provide an option for taking photos of the vehicle immediately after the crash event to help expedite the claim review process. However, this program may also include drawbacks. Specifically, where an operator of the vehicle involved in the crash event is in shock or affected physically and/or mentally from the crash event, the operator may not be able to provide adequate photos or any photos at all to the insurance company. Additionally, in order to provide the most accurate assessment of the damage, the insurance company relies solely on the operator of the vehicle to take adequate pictures of the damage. Where the pictures are not adequate, and/or the device used to take the pictures only produces low quality photos, the insurance company may not be able to provide an accurate assessment of the damage to the vehicle. As a result, the insurance company may request additional pictures at a later date, extending the assessment process, or in some case may still require an insurance adjuster to find time to travel to view the damage to the vehicle in person.

Additionally, every year in the US, there are some 16 million vehicle crashes. These collision events generate some 2 million claims annually for whiplash, a soft tissue injury to the neck, often associated with crash events, particularly rear end collisions. Because whiplash injuries are usually not measurable by conventional medical instruments, actual injury to the vehicle occupant is difficult to quantify with any scientific certainty. In large part because of the difficulty determining the actual soft tissue injury, whiplash and other soft tissue claims which are fraudulent or exaggerated are reported to cost the property and casualty industry in the US billions of dollars annually.

SUMMARY

Generally, embodiments discussed herein are related to a detection system for analyzing a vehicle involved in a crash event. More particularly the disclosure relates to a system and a method for analyzing a crash event involving a vehicle, including estimating a damage cost to the vehicle and estimating injuries to the occupant of the vehicle involved in the crash event. The detection system, and method for analyzing the crash event using the detection system may receive information or data relating to the crash event involving the vehicle just moments after the crash event occurred. Once the information relating to the crash event is received by the detection system, the information may be processed, analyzed, and/or compared, to instantaneously provide an estimated damage cost to the vehicle involved in the crash event, as well as, provide an instantaneous estimate for injuries suffered by occupant(s) of the vehicle. These instantaneous and/or "real-time" estimations and information relating to the crash event may be beneficial for an insurance carrier, who may provide, fast and accurate processing of an insurance claim. Additionally, using the instantaneous estimations and information insurance carriers may be able to process the claim more effectively and quickly, while reducing costs associated with fraudulent and exaggerated claims. The information may also be beneficial for a user who may have an interest (e.g., emergency services, fleet, vehicle owners, lessor and the like) in the vehicle involved in the crash event, to obtain the quickest, and most accurate information relating to the crash event. Finally, the detection system and process for analyzing the crash event may fully or completely automate the entire crash event involving the vehicle including the detection, analysis and/or reporting process. By automating (e.g., no human interaction or reliance) the process of crash reporting and analysis of the crash event, occupant health/safety may be improved, cost of insurance and processing may be reduced and the overall claims process may be more efficient for insurance carriers, fleets, government agencies or anyone operating a vehicle.

One embodiment may include a method for instantaneously estimating a damage cost for a vehicle involved in a crash event. The method may comprise automatically receiving an acceleration of the vehicle over a predetermined length of time in substantial real-time, determining a change in velocity of the vehicle involved in the crash event based, at least in part, on the acceleration of the vehicle, determining crash force information for the vehicle involved in the crash event based, at least in part, on the acceleration of the vehicle and the change in velocity of the vehicle, determining physical-damage characteristics of the vehicle subsequent to the crash event based, at least in part, on at least one of the acceleration of the vehicle, the change in velocity of the vehicle and the crash force information for the vehicle, and calculating the estimated damage cost to the vehicle involved in the crash event based, at least in part, on at least one of the determined crash force information for the vehicle, and the determined physical-damage characteristics of the vehicle.

Another embodiment may include a method for instantaneously estimating injuries to an occupant of a vehicle involved in a crash event. The method may comprise automatically receiving an acceleration of the vehicle over a predetermined length of time in substantial real-time, determining a change in velocity of the vehicle involved in the crash event based, at least in part, on the acceleration of the vehicle, determining occupant information relating to the occupant of the vehicle involved in the crash event, determining pre-solved crash information for the vehicle based, at least in part, on at least one of the acceleration of vehicle, and the change in velocity of the vehicle, and calculating estimated forces exerted on the occupant. The calculating of the estimated forces may be based, at least in part, on at least one of the acceleration of the vehicle, the change in velocity of the vehicle, the determined occupant information relating to the occupant, and the determined pre-solved information for the vehicle. The method may also comprise calculating an injury probability for various body portions for the occupant of the vehicle based on the estimated forces exerted on the occupant.

A further embodiment may include a system comprising a processor, and a memory coupled to the processor. The memory may store instructions which, when executed by the processor, causes the processor to perform a method for analyzing a crash event. The method may comprise receiving an acceleration of a vehicle over a predetermined length of time, the vehicle involved in the crash event, determining a change in velocity of the vehicle involved in the crash event based, at least in part, on the acceleration of the vehicle, determining vehicle information relating to the vehicle involved in the crash event, and at least one of, estimating a damage cost for the vehicle involved in the crash event, and estimating injuries to an occupant of the vehicle involved in the crash event.

BRIEF DESCRIPTION OF THE DRAWINGS

The disclosure will be readily understood by the following detailed description in conjunction with the accompanying drawings, wherein like reference numerals designate like structural elements, and in which:

FIG. 7 depicts exemplary notifications relating to a crash event, according to additional embodiments.

FIG. 8 depicts an exemplary bill of materials (BOM) for a vehicle involved in a crash event, according to embodiments.

FIG. 11A depicts an exemplary Abbreviated Injury Scale (AIS) chart for an occupant of a vehicle involved in a crash event, according to embodiments.

FIG. 11B depicts an exemplary notification relating to a crash event, according to another embodiment.

Figure 1:
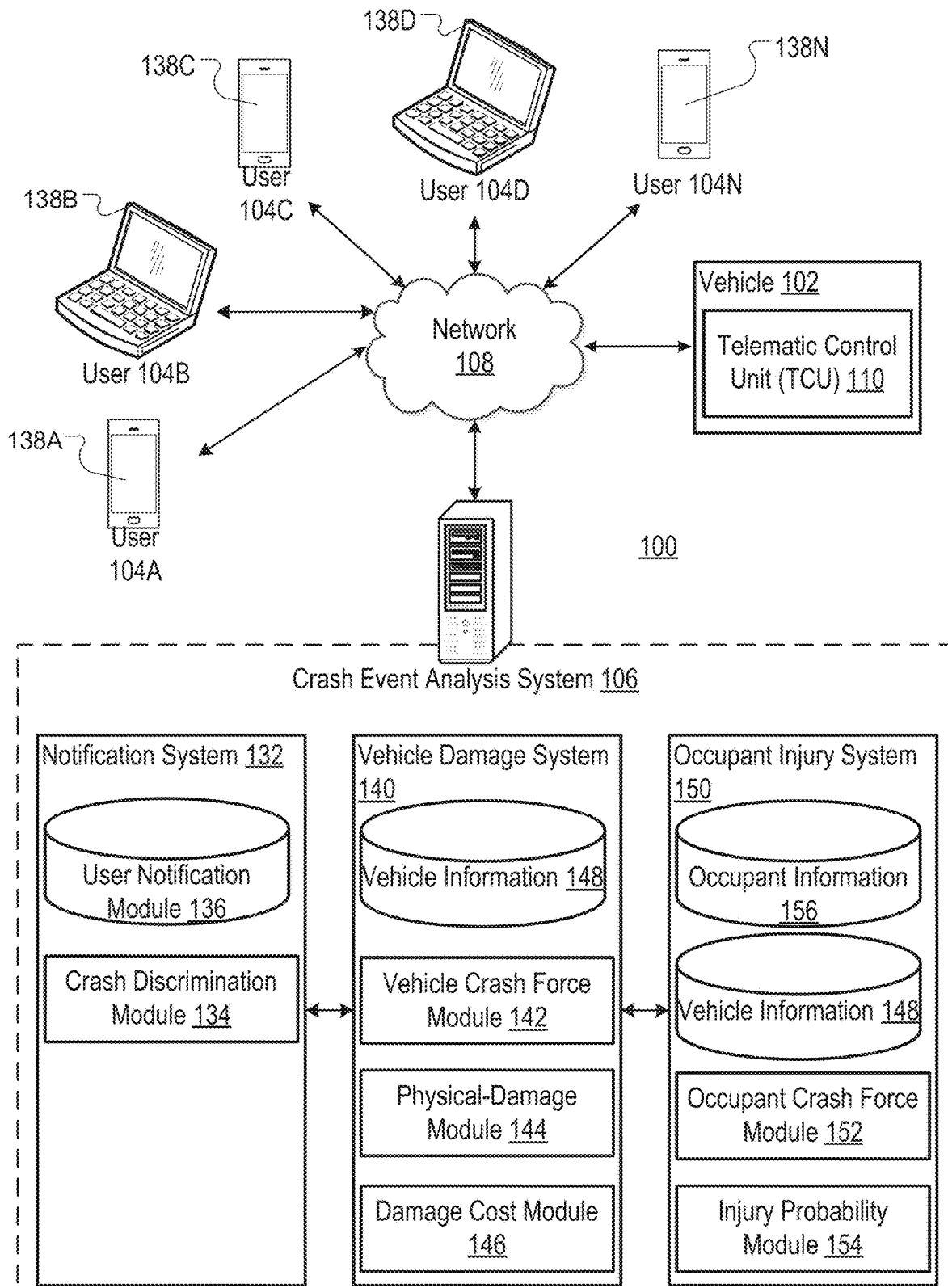
FIG. 1 depicts an illustrative exemplary detecting system for analyzing a crash event according to one or more embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The disclosure relates generally to detection system for a vehicle involved in a crash event. More particularly the disclosure relates to a system and a method for analyzing a crash event involving a vehicle, including estimating a damage cost to the vehicle and estimating injuries to the occupant of the vehicle involved in the crash event.

The detection system, and method for analyzing the crash event using the detection system may receive information or data relating to the crash event involving the vehicle just moments after the crash event occurred. Once the information relating to the crash event is received by the detection system, the information may be processed, analyzed, and/or compared, to instantaneously provide an estimated damage cost to the vehicle involved in the crash event, as well as, provide an instantaneous estimate for injuries suffered by occupant(s) of the vehicle. These instantaneous and/or "real-time" estimations and information relating to the crash event may be beneficial for an insurance carrier, who may provide, fast and accurate processing of an insurance claim. Additionally, using the instantaneous estimations and information insurance carriers may be able to process the claim more effectively and quickly, while reducing costs associated with fraudulent and exaggerated claims. The information may also be beneficial for a user who may have an interest (e.g., emergency services, fleet, vehicle owners, lessor and the like) in the vehicle involved in the crash event, to obtain the quickest, and most accurate information relating to the crash event. Finally, the detection system and process for analyzing the crash event may fully or completely automate the entire crash event involving the vehicle including the detection, analysis and/or reporting process. By automating (e.g., no human interaction or reliance) the process of crash reporting and analysis of the crash event, occupant health/safety may be improved, cost of insurance and processing may be reduced and the overall claims process may be more efficient for insurance carriers, fleets, government agencies or anyone operating a vehicle.

These and other embodiments are discussed below with reference to FIGS. 1-14. However, those skilled in the art will readily appreciate that the detailed description given herein with respect to these Figures is for explanatory purposes only and should not be construed as limiting.

The terms "instantaneous," "real-time" and/or any similar term may be understood as happening immediately after or shortly thereafter a crash event has occurred and/or has been detected. That is, terms relating to timing for performing an action discussed herein, such as "instantaneous" or "real-time," may be understood as performing an action within a shortened time frame after a crash event has occurred. In a non-limiting example, "instantaneous" or "real-time" events or actions discussed herein may be performed within a measurable time frame between fractions of a second and multiple hours (e.g., 2-8 hours) after a crash event has occurred. Additionally, the term "automated" may be understood as processes happening without the reliance, dependency or requirement of human interaction for analyzing a crash event involving a vehicle, and specifically, to instantaneously provide an estimated damage cost to the vehicle involved in the crash event, as well as, provide an instantaneous estimate for injuries suffered by occupant(s) of the vehicle FIG. 1 illustrates an exemplary system 100 for analyzing a crash event involving a vehicle according to one or more embodiments of the present disclosure. More specifically, FIG. 1 illustrates a system 100 which may analyze data pertaining to the operation of a vehicle 102 involved in a crash event, and subsequently provide notifications, damage cost estimations and/or vehicle occupant injury probabilities to a predetermined group of users, such as users 104A-104N.

As shown in FIG. 1, and discussed in detail herein, the system 100 enables communication between the vehicle 102 and a crash event analysis system 106 (hereafter, "analysis system 106") responsible for determining and/or providing the notifications, damage cost estimations and vehicle occupant injury probabilities over the communication network 108. The communication network 108 may be any other suitable communication system including, but not limited to, internet, cellular data network, hardwire, multi-server system and the like. Additionally shown in FIG. 1, and discussed herein, the system 100 may enable communication between users 104A-104N and analysis system 106 over the network 108.

Vehicle 102 of system 100 may include any suitable structure, component and/or machine utilized for transporting users and/or good. In a non-limiting example, vehicle 102 may be configured as a personal automobile that may transport at least one occupant, for example, a driver and passenger(s). In other non-limiting examples, vehicle 102 may configured as, but is not limited to, construction machinery (e.g., bulldozers, steam rollers, cherry pickers, and so on), heavy transport vehicles (e.g., tractor-trailers), aviation vehicles (e.g., commercial planes), motorcycles, non-motorized vehicles (e.g., bicycles, tow wagons), and the like.

Users 104A-104N may include a group of predetermined people, entities and/or companies interested in vehicle 102. That is, users 104A-104N may be a group of people, entities or companies that may be predetermined and/or preregistered with analysis system 106, who may be involved in the operation or ownership of vehicle 102. In a non-limiting example where vehicle 102 is a personal automobile, users 104A-104N may consist of the owner of vehicle 102, family members of the vehicle owner permitted to drive vehicle 102, insurance company of vehicle 102 and a lender of vehicle 102, where vehicle 102 is leased or still in payment for ownership.

Figure 2:
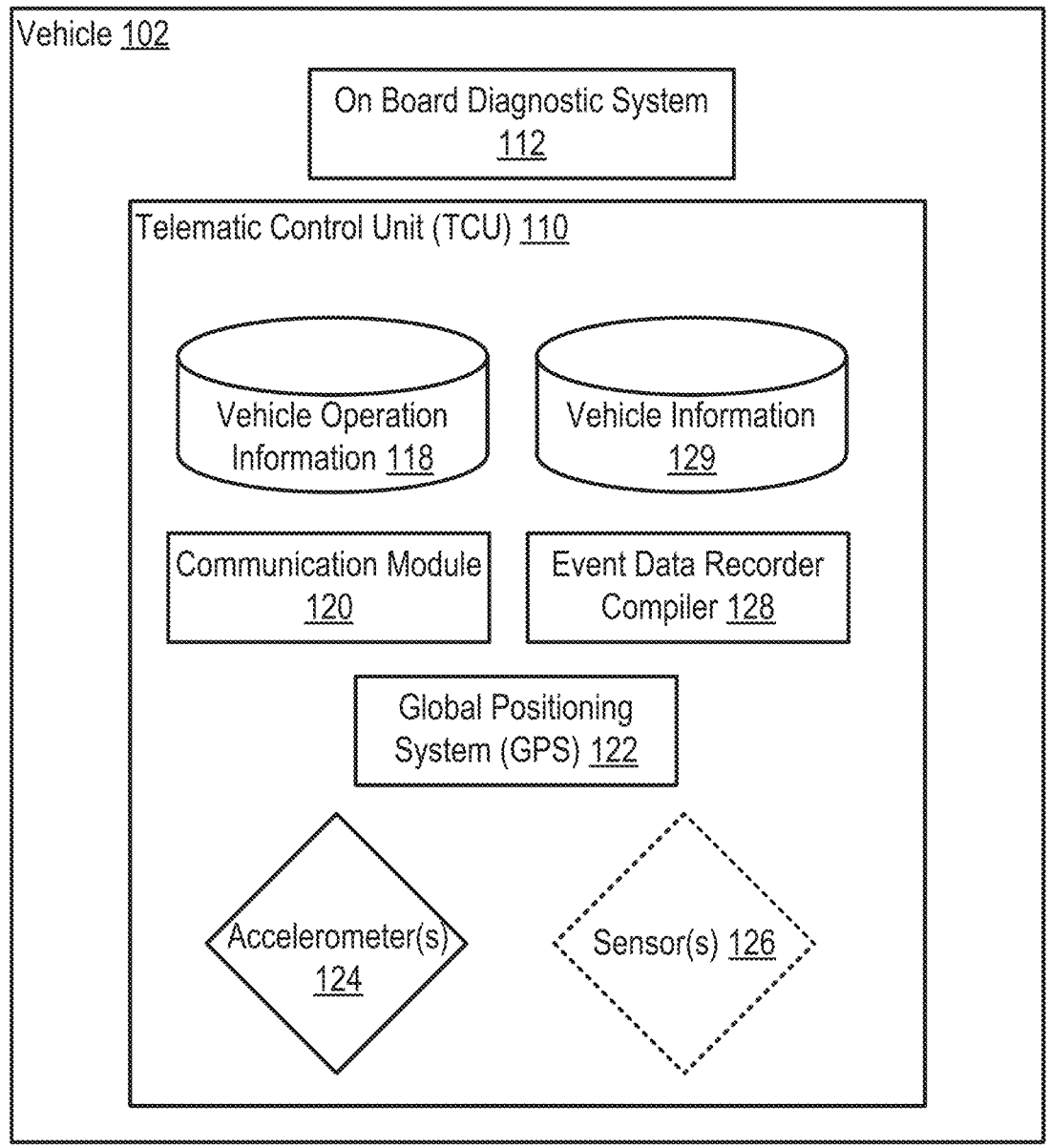
FIG. 2 depicts an illustrative block diagram of a vehicle including an on-board diagnostic system and a telematics control unit, according to one or more embodiments.
Figure 3:
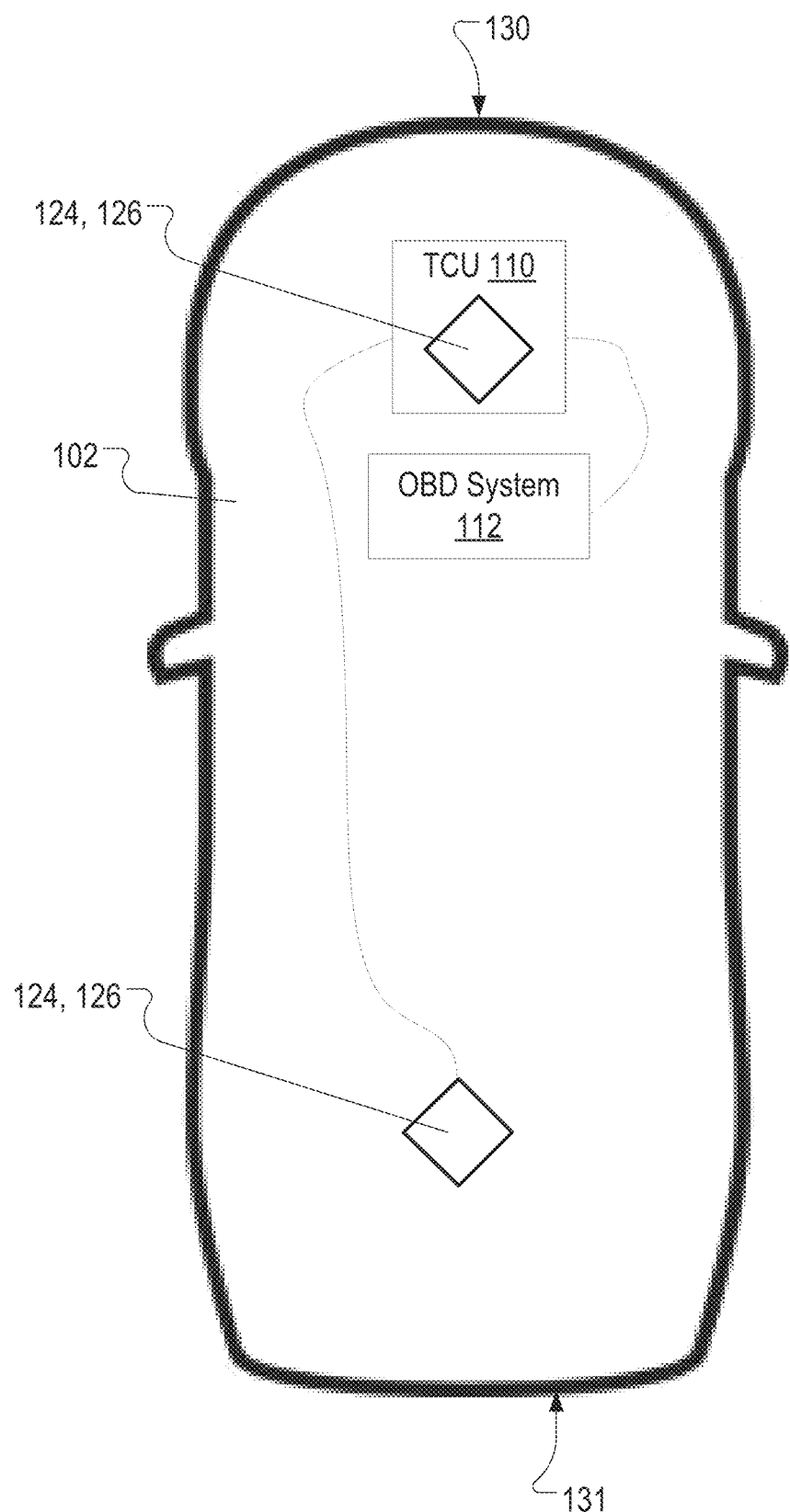
FIG. 3 depicts an illustrative top view of the vehicle of FIG. 2, according to embodiments.

As shown in FIG. 1, and with reference to FIGS. 2 and 3, vehicle 102 may include a telematic control unit 110 (hereafter, "TCU 110"). TCU 110 may be positioned within and/or coupled to vehicle 110 for obtaining data relating to the operation of vehicle 102 and crash related data for vehicle 102 when vehicle 102 is involved in a crash event, as discussed herein, and subsequently providing the data to analysis system 106. As shown in FIGS. 2 and 3, TCU 110 may in electronic communication with an on-board diagnostics (OBD) system 112 of vehicle 102. TCU 110 may in electrical communication with OBD system 112 for obtaining operational data from OBD system 112 relating to sub-systems of vehicle 102. In non-limiting examples, and as discussed herein, TCU 110 may obtain data from OBD system 112 relating to, but not limited to: the speed of vehicle 102, brake usage in vehicle 102, position of occupants sitting in various seats of vehicle 102, whether the occupants of vehicle 102 are using a seat belt, an occupant's seat position with vehicle 102, and so on. In non-limiting examples, TCU 110 may be hardwired into OBD system 112 of vehicle 102, or alternatively, TCU 110 may in electronic communication with OBD system 112 using any suitable means for sharing information (e.g., Bluetooth).

TCU 110, as shown in FIG. 2, may include a vehicle operation information storage device 118, a communication module 120, a global position system (GPS) 122, and at least one accelerometer 124. Additionally, TCU 110 may include additional, optional sensor(s) 126 (shown in phantom). Vehicle operation information storage device 118 may include a short-term or long term storage device that may store data relating to the operation of vehicle 102. Specifically, vehicle operation information storage device 118 may store data obtained from OBD system 112 of vehicle 102, and may also store data obtained by GPS 122, accelerometer 124, and when applicable, sensors 126, as discussed herein.

Communication module 120 of TCU 110 may be configured to communicate with analysis system 106 over network 108 (see, FIG. 1), as discussed herein. Specifically, communication module 120 may be configured to send data relating to the operation of vehicle 102, as obtained by TCU 110, to analysis system 106 for processing in "real-time." Additionally, and as discussed herein, communication module 120 may be configured to send determined and/or calculated data relating to the crash event of vehicle 102 as determined by event data recorder compiler (EDRC) 128 of TCU 100. Communication module 120 may send the data obtained by TCU 110/calculated by EDRC 128 continuously, at predetermined intervals, or may only send the data when the data is required for processing in view of an event involving vehicle 102. In a non-limiting example, and as discussed herein, communication module 120 of TCU 110 may only send the obtain data relating to the operation of vehicle 102 when the obtained data indicates that vehicle 102 has been involved in a crash event (e.g., car accident). TCU 110 may send the data in substantial "real-time," or nearly instantaneous of the crash event so analysis system 106 may immediately or instantaneously begin to perform actions and/or process to analyze the crash event involving vehicle 102, as discussed herein. Communication module 120 may be configured as any suitable component or system that may transfer data to analysis system 106 over network 108.

GPS 122 may be configured to determine a variety of operational information for vehicle 102. Specifically, GPS 122 of TCU 110 may be configured to determine the location of vehicle 102, the orientation of vehicle 102, and the velocity or speed of vehicle 102. The operational information for vehicle 102 determined by GPS 122 may be stored on vehicle operation information storage device 118, and may be provided to analysis system 106 via communication module 120 of TCU 110.

As shown in FIG. 2, TCU 110 may also include at least one accelerometer 124. Accelerometer 124 of TCU 110 may continuously monitor, determine and provide, for vehicle operation information storage device 118, the acceleration of vehicle 102 over time. The acceleration of vehicle 102 determined by accelerometer 124 may include multi-axis or multi-orthogonal direction acceleration data (see, FIG. 4). As discussed herein, the multi-axis acceleration data determined by accelerometer 124 of TCU 110 may aid in determine the speed, direction of movement, displacement, applied or exerted force and/or estimated damage to vehicle of vehicle 102 and injury probability to an occupant of vehicle 102, when vehicle 102 is involved in a crash event. In a non-limiting example, accelerometer 124 may be configured as a multi-axis accelerometer In order to determine multi-axis acceleration data for vehicle 102. In another non-limiting example, TCU 110 may include a plurality of single-axis accelerometers that measure a single, distinct axis or orthogonal direction of acceleration for vehicle 102.

Additional sensors 126 (shown in phantom) may also be included in TCU 110. Sensors 126 may be configured as distinct sensors, and distinct sensor configurations that may obtain distinct data relating to the operation of vehicle 102, which may be stored on vehicle operation information storage device 118 and/or transmitted to analysis system 106 over network 108 via communication module 120, as discussed herein. In non-limiting examples, sensor 126 may be configured as a gyroscope for detecting change in the orientation. In another non-limiting example, sensor 126 may be configured as a plurality of force sensor positioned throughout vehicle 102, where each force sensor is configured to measure the force exerted on vehicle 102 during a crash event.

TCU 110 may also include an event data recorder compiler (EDRC) 128. EDRC 128 may process the information or data obtained by TCU 110 of vehicle 102 involved in the crash event. More specifically, when a crash event occurs, components of TCU 110 (e.g., vehicle operation storage information 118, accelerometer 124 and so on) may automatically send the information and/or data relating to the crash event to EDRC 128 to begin processing the information to instantaneously analyze the crash event involving vehicle 102 in "real-time." In a non-limiting example, EDRC 128 may obtain data from TCU 110 of vehicle 102 in "real-time," and may process the data to determine if vehicle 102 was involved in a crash event, and subsequently, determine a severity of the crash event involving vehicle 102. The obtained data from TCU 110 (e.g., change in speed or velocity, acceleration, and so on) may be processed by EDRC 128 to determine crash force information. The crash force information may relate to an amount of crash force exerted on vehicle 102, and/or a direction of the crash force exerted on vehicle 102 during the crash event. The obtained data and the determined crash force information may be subsequently compared to predetermined metrics relating to similar data specific to vehicle 102 to determine the severity of the crash. The predetermined metrics may define data ranges (e.g., change in speed or velocity, acceleration, crash force, and so on) associated with predetermined crash thresholds for vehicle 102, which may be associated with distinct severities of crash events involving vehicle 102. As a result, when EDRC 128 compares the obtained data and determined crash force information with the predetermined metrics for vehicle 102, a predetermined crash threshold for the crash event involving vehicle 102 may be determined, and consequently, a severity of the crash event involving vehicle 102 may also be determined. The predetermined metrics and predetermined crash thresholds for vehicle 102 utilized by EDRC 128 may be stored on vehicle information storage device 129 of TCU 110.

Additionally, EDRC 128 may determine the crash force and/or direction of the crash force using the acceleration information of vehicle 102 determined by TCU 110. Specifically, the multi-axis or multi-orthogonal direction acceleration data detected and transmitted by accelerometer(s) 124 of TCU 110 may be received by EDRC 128, and may be subsequently analyzed and compared to determine the crash force and/or direction of the crash force for vehicle 102 involved in the crash event. In the non-limiting example, by analyzing and/or integrating the multi-axis acceleration data, and comparing the magnitude, the direction and/or the wave pattern of the multi-axis acceleration data, the amount of crash force and/or the direction of the crash force may be determined by vehicle crash force module 142.

Finally, EDRC 128 may also determine the change in velocity or speed of the vehicle 102 involved in the crash event. EDRC 128 of TCU 110 may determine the change in velocity of the vehicle 102 by integrating the acceleration data relating to vehicle 102, as obtained by TCU 100, and specifically, accelerometer 124 of TCU 110.

Although discussed herein as receiving information to determine information relating to a crash event, EDRC 128 may also obtain and/or process information for indicating other, distinct events undergone by vehicle 102. In a non-limiting example, EDRC 128 may obtain and/or receive data from distinct components of TCU 110 to determined such events as when an occupant is using vehicle 102 on a less than desirable terrain (e.g., off-road, rough terrain), or when vehicle 102 passes over a speed bump a higher-than-recommended speed. By enabling EDRC 128 to determine various events, and compare the events, EDRC 128 of TCU 110 may distinguish between the crash events and non-crash events involving vehicle 102 to ultimately determine when to transfer information or data to analysis system 106, as discussed herein.

Briefly turning to FIG. 3, and as discussed herein, accelerometer 124 of TCU 110 may be positioned within and coupled to vehicle 102 to accurately measure the acceleration of vehicle 102 during operation and before, during and subsequent to a crash event involving vehicle 102. As shown in FIG. 3, TCU 110, including accelerometer 124, may be positioned adjacent a front end 130 of vehicle 102, and may be in electrical communication with OBD system 112. Additionally, as shown in FIG. 3, a distinct accelerometer 124 and/or an additional sensor 126 (shown in phantom) may be positioned within and/or coupled to vehicle 102, adjacent a back end 131 of vehicle 102. It is understood, however, that the positioning of TCU 110, the accelerometer 124, and when applicable, the additional sensor 126, within vehicle 102 may vary dependent on vehicle construction. That is, the position of TCU 110, accelerometer 124, and/or sensor 126, as shown in FIG. 3, may be merely exemplary.

Returning to FIG. 1, analysis system 106 may include a plurality of distinct system utilized in analyzing a crash event of vehicle 102. The plurality of distinct systems of analysis system 106 may be in electronic communication with one another and may transmit, receive and/or share data, between the systems, as discussed herein.

As shown in FIG. 1, analysis system 106 may include a notification system 132. Notification system 132 may be configured to provide notifications to at least one user 104A-104N of a predetermined group of users in response to the detection of a crash event involving vehicle 102, as determined by TCU 110. Notification system 132 may include a crash discrimination module 134 for processing information relating to vehicle 102 involved in the crash event, similar to EDRC 128 of TCU 110, and determining if the information relating to vehicle 102 involved in the crash event exceeds at least one predetermined crash threshold, and a user notification module 136 for determining which users of the predetermined group of users receive a notification based on the information relating to vehicle 102 involved in the crash event, the predetermined crash threshold and/or the severity of the crash event involving vehicle 102.

In a non-limiting example, crash discrimination module 134 may receive the determined and/or calculated information determined by EDRC 128 of TCU 110, and may process the information further. In another non-limiting example, crash discrimination module 134 may receive the information or data obtained by TCU 110 of vehicle 102, and may process the information similar to EDRC 128, as discussed herein with respect to FIG. 2. In the non-limiting, crash discrimination module 134 may process the information in place of EDRC 128 (e.g., when EDRC 128 cannot process the information for TCU 110), or may process the information from TCU 110 in addition to EDRC 128 of TCU 110 processing the information. Where crash discrimination module 134 processes the information in addition to EDRC 128, the information determined and/or calculated by crash discrimination module 134, as discussed herein, may be secondary determined or calculated information. This secondary determined or calculated information may be used to verify the accuracy of the determined or calculated information of EDRC 128 of TCU 110 and/or may be determined to provide the information where EDRC 128 of TCU 110 cannot determine or calculate the information and/or cannot communicate with analysis system 106.

In the non-limiting example where crash discrimination module 134 determines calculates, and/or analyzes information or data relating to the crash event, TCU 110 may automatically send information and/or data relating to the crash event to crash discrimination module 134 to begin processing the information to instantaneously analyze the crash event involving vehicle 102 in "real-time." In a non-limiting example, crash discrimination module 134 may obtain data sent from TCU 110 of vehicle 102 in "real-time," and may process the data to determine if vehicle 102 was involved in a crash event, and subsequently, determine a severity of the crash event involving vehicle 102, as similarly discussed herein with respect to EDRC 128. The obtained data sent from TCU 110 (e.g., change in speed or velocity, acceleration, and so on) may be processed by crash discrimination module 134 to determine crash force information. The crash force information may relate to an amount of crash force exerted on vehicle 102, and/or a direction of the crash force exerted on vehicle 102 during the crash event. The obtained data and the determined crash force information may be subsequently compared to predetermined metrics relating to similar data specific to vehicle 102 to determine the severity of the crash. The predetermined metrics may define data ranges (e.g., change in speed or velocity, acceleration, crash force, and so on) associated with predetermined crash thresholds for vehicle 102, which may be associated with distinct severities of crash events involving vehicle 102. As a result, when crash discrimination module 134 compares the obtained data and determined crash force information with the predetermined metrics for vehicle 102, a predetermined crash threshold for the crash event involving vehicle 102 may be determined, and consequently, a severity of the crash event involving vehicle 102 may also be determined, as discussed herein with respect to EDRC 128 of TCU 110 (see, FIG. 2).

User notification module 136 of notification system 132 may determine which of the predetermined group of users 104A-104N may receive notifications regarding the crash event involving vehicle 106. Specifically, user notification module 136 may receive the determined severity and/or the predetermined crash threshold of the crash event involving vehicle 102, and may subsequently provide notifications to the predetermined group of user 104A-104N, based on the severity and/or the predetermined crash threshold. The notifications provided by user notification module 136 may be sent through network 108, to user's 104A-104N registered electronic device 138A-138N. The electronic devices 138A-

138N may be registered with notification system 132 of analysis system 106, such that when the crash event involving vehicle 102 occurs, users 104A-104N may receive the notification on electronic device 138A-138N. The electronic device 138A-138N may include any suitable electronic device capable of receiving electronic data, including, but not limited to, tablet computer, laptop computer, desktop computer, mobile phone, or any other product that may communicate with analysis system 106 via network 108.

The notifications provided by user notification module 136 may include information or data relating to the crash event and/or vehicle 102 involved in the crash event. Specifically, information or data sent from user notification module 136 to users 104A-104N may include information or data obtained from OBD system 112 of vehicle 104, determined by TCU 110 of vehicle 102, and/or determined by crash discrimination module 134 of notification system 132, as discussed herein. In non-limiting examples, the notifications may include, but is not limited to, information or data including, but not limited to: the change in speed of vehicle 102 prior to, during and subsequent to the crash event, the multi-axis acceleration data of vehicle 102 prior to, during and subsequent to the crash event, exerted crash force, a direction of the crash force exerted on vehicle 102 during the crash event, location of the crash event, time of the crash event, date of the crash event, severity of the crash event, a license plate number, and/or a vehicle identification number (VIN).

Additionally, user notification module 136 may send distinct notifications including, at least partially, distinct information or data to users 104A-104N. That is, distinct notifications may be sent to users 104A-104N at different times, where each of the distinct notifications may include similar information and/or may include distinct information, not including on the distinct notification. In a non-limiting example, user notification module 136 of notification system 132 may send two distinct notifications to users 104A-104N. In a first notification, user notification module 136 may send an SMS message and/or an e-mail to users 104A-104N directly after the crash event involving the vehicle occurs. The first notification may include a notification that a crash event has occurred with vehicle 102, identify vehicle 102 by license plate number, a time and date of the crash event, a severity level of the crash event, and a location of the crash event. In the non-limiting example, user notification module 136 of notification system 132 may send a second notification to users 104A-104N, shortly after sending the first notification. The second notification may include a time and date of the crash event, a severity level of the crash event, a location of the crash event, a license plate number, and/or a vehicle identification number (VIN), similar to the first notification. In addition, the second notification may also include the speed of vehicle 102 prior to, during and subsequent to the crash event, the multi-axis acceleration data of vehicle 102 prior to, during and subsequent to the crash event, exerted crash force on vehicle 102 during the crash event, and a direction of the crash force exerted on vehicle 102 during the crash event. As a result of the detail provided in the second notification, user notification module 136 may send users 104A-104N a link or instructions prompting them to connect with analysis system 106 to view the information provided in the second notification.

Furthermore, specific users of the predetermined group of users 104A-104N may receive a notification from user notification module 136 of notification system 132 based upon a predetermined notification profile specific to the predetermined group of users 104A-104N and/or specific to vehicle 102. More specifically, the information obtained, and/or determined by TCU 110 and/or crash discrimination module 134 may dictate which specific users of the predetermined group of users 104A-104N may receive a notification. Additionally, predetermined perimeters involving each user 104A-104N may also determine which specific users receive a notification from user notification module 136. The predetermined parameters may be automatically established in analysis system 106, or may be set up by a user, and may be based on the user's personal preference for receiving notifications.

In a non-limiting example, a notification may be sent to a first select group (e.g., users 104A-104D) of the predetermined group of users 104A-104N when it is determined that the severity of the crash and/or the information obtained/determined regarding the actual crash event exceeds a predetermined crash threshold. In the non-limiting example, and as discussed herein, exceeding the predetermined crash threshold may correlate to detected and/or calculated information relating to the crash event involving vehicle 102 having and/or exceeding a predetermined crash severity, predetermined speed threshold, predetermined acceleration threshold and/or predetermined exerted force threshold.

In another non-limiting example, a notification may be sent to a second select group (e.g., users 104A and 104B) of the predetermined group of users 104A-104N when it is determined that the severity of the crash and/or the information obtained/determined regarding the actual crash event does not exceed a predetermined crash threshold. In the non-limiting example, and as discussed herein, the predetermined crash threshold may not be exceeded when the detected and/or calculated information relating to the crash event involving vehicle 102 does not exceed a predetermined crash severity, predetermined speed threshold, predetermined acceleration threshold and/or predetermined exerted force threshold.

Although discussed herein as providing information relating to the crash severity, acceleration, change in speed and so on, notification system 132 may provide additional detected and/or calculated information that may relate to the crash event involving vehicle 112. In non-limiting examples, notification system 132 may provide a notification to a user which may include information relating to whether emergency response units have been dispatched to the location of the crash event, if the airbags of vehicle 102 have been deployed, number of occupants of the vehicle and the like.

Analysis system 106 may also include a vehicle damage system 140. Vehicle damage system 140 may be configured to analyze the information detected, obtained and/or calculated relating to the crash event, and may instantaneously determine an estimate of damage cost for vehicle 102 involved in the crash event. Vehicle damage system 140 may include a vehicle crash force module 142 for processing information relating to vehicle 102 involved in the crash event and determining information relating to vehicle 102 involved in the crash event. Vehicle damage system 140 may also include a physical-damage module 144 for determining physical-damage characteristics of vehicle 102 based, at least in part, on the determined information from the vehicle crash force module 142, and damage cost module 146 for calculating an estimated damage cost to vehicle 102 involved in the crash. Additionally, vehicle damage system 140 may also include a vehicle information storage device 148 which may contain information relating to vehicle 102 utilized by the various modules of vehicle damage system 140 for estimating damage cost for vehicle 102 involved in the crash event, as discussed herein.

Like EDRC 128 of TCU 110 (see, FIG. 2) or crash discrimination module 134 of notification system 132, vehicle crash force module 142 may receive the information or data obtained by TCU 110 of vehicle 102, and may process the information. Similar to crash discrimination module 134, vehicle crash force module 142 may process the information in place of EDRC 128, or may process the information to create secondary information, in addition to the determined and/or calculated information of EDRC 128. In a non-limiting example wherein vehicle crash force module 142 processes information from TCU 110, vehicle crash force module 142 may obtain data sent from TCU 110 of vehicle 102, and may process the data to determine a change in velocity of vehicle 102 based on the automatically received acceleration data for vehicle 102, determine an amount of crash force exerted on vehicle 102, and a direction of the crash force exerted on vehicle 102 during the crash event. Vehicle crash force module 142 may determine the change in velocity of the vehicle 102 by integrating the acceleration data relating to vehicle 102, as obtained and/or automatically sent by TCU 100. In another non-limiting example, and as similarly discussed herein with respect to crash discrimination module 134 of notification system 132, vehicle crash force module 142 may receive the determined and/or calculated information (e.g., crash threshold, severity of the crash event) directly from EDRC 128 of TCU 110.

Additionally, and similar to EDRC 128 of TCU 110, vehicle crash force module 142 may determine the crash force and/or direction of the crash force using the acceleration information of vehicle 102 received from TCU 110. Specifically, the multi-axis or multi-orthogonal direction acceleration data detected and transmitted by accelerometer(s) 124 of TCU 110 may be received by vehicle crash force module 142, and may be subsequently analyzed and compared to determine the crash force and/or direction of the crash force for vehicle 102 involved in the crash event. In the non-limiting example, by analyzing and/or integrating the multi-axis acceleration data, and comparing the magnitude, the direction and/or the wave pattern of the multi-axis acceleration data, the amount of crash force and/or the direction of the crash force may be determined by vehicle crash force module 142.

Physical-damage module 144 may determine physical-damage characteristics of vehicle 102 based, at least in part, on the determined information from the vehicle crash force module 142. In a non-limiting example, physical-damage module 144 may utilize the acceleration data received from TCU 110, the change in speed or velocity of the vehicle 102 determined using the acceleration data, and/or the determined crash force information (e.g., the amount of crash force and/or the direction of the crash force) for vehicle 102 to determine physical-damage characteristics of vehicle 102 involved in the crash event. Additionally in the non-limiting example, physical-damage module 144 may determine physical-damage characteristics of vehicle 102 using vehicle-specific crash information relating to vehicle 102 stored in vehicle information storage device 148. The vehicle-specific crash information may relate, but is not limited, to predetermined crash information (e.g., NHTSA crash ratings) specific to vehicle 102 and/or information relating to manufacturing/material composition (e.g., steel type or grade), tolerances (e.g., compression force for deformation) and/or specifications (e.g., dimensions of frame or wheel base) specific to vehicle 102 involved in the crash event. Using the information received, obtained, provided and or determined by vehicle crash force module 142, physical-damage module 144 may determine physical-damage characteristics of vehicle 102. In a non-limiting example, the physical-damage characteristics of vehicle 102 may be determined by physical-damage module 144 by calculating an anticipated crush deformation of vehicle 102 involved in the crash event. In another non-limiting example, the physical-damage characteristics of vehicle 102 may be determined by physical-damage module 144 by obtaining standardized crash information or crush deformation information for vehicle 102 from vehicle information storage device 148. The crush deformation of vehicle 102 may be the amount of deflection or deformation (e.g., measured in inches) of a portion of vehicle 102 that may be damaged or impacted as a result of the crash event. As discussed herein, the crush deformation may aid in both estimating the damage cost to vehicle 102 involved in the crash event, and estimating the injuries to an occupant of vehicle 102.

Damage cost module 146 may calculate the estimated damage cost to vehicle 102 involved in the crash event based, at least in part, on the determined information from the vehicle crash force module 142 and physical-damage module 144. Initially, damage cost module 146 may utilize the acceleration data received from TCU 110, the change in speed for vehicle 102, the determined crash force and/or direction of the crash force (e.g., crash force information) from vehicle crash force module 142, and the physical-damage characteristics (e.g., calculated crush deformation) for vehicle 102 from physical-damage module 144, to determine which parts or components of vehicle 102 may be damaged in the crash event. Additionally in the non-limiting example, damage cost module 146 may also determine the severity of the damage to each damage part of vehicle 102, as determined based on, at least in part, the information from vehicle crash force module 142, and physical-damage module 144. Based on the determined severity of damage to the parts of vehicle 102 effected in the crash event, damage cost module 146 may also determine which parts may be replaced and/or repaired.

Once damage cost module 146 determines the parts of vehicle 102 damaged as a result of the crash event, and more specifically, the parts that require replacement and/or repair, damage cost module 146 may determine a first cost associated with repairing damaged parts of vehicle 102, and a second cost associated with replacing damaged parts of vehicle 102. In the non-limiting example, damage cost module 146 may provide individual, estimated cost for repairing and/or replacing each damaged part of vehicle 102 involved in the crash event using predetermined monetary values for each part specific to vehicle 102. The information relating to the predetermined monetary value for replacing/repairing each part specific to vehicle 102 may be stored in and/or obtained from vehicle information storage device 148 of vehicle damage system 140. In another non-limiting example, damage cost module 146 may determine a plurality of estimated costs for repairing/replacing the damaged parts of vehicle 102, where some of the damaged parts may either be repaired or replaced. The plurality of determined, estimated costs may provide cost options and/or comparisons for one of repairing and/or replacing the damaged parts.

In addition to calculating the estimated damage cost to vehicle 102, damage cost module 146 may also generate a bill of materials (BOM) based on the estimated and/or detected damage to vehicle 102 involved in the crash event. In a non-limiting example, and using the estimated damage to vehicle 102 calculated by vehicle damage system 140, damage cost module 146 may generate a BOM specific to vehicle 102 involved in the crash event. BOM may include, but is not limited to, a list of the damaged parts, a cost associated with repairing the damaged parts when applicable, a cost associated with replacing the damaged parts when applicable, and total costs for replacing, repairing and/or any combination of replacing and repairing the damaged parts of vehicle 102. As discussed herein, the BOM generated by damage cost module 146 may be provided to a user (e.g., users 104A-104N) specific to vehicle 102, who may be affected by the crash event.

Additionally, damage cost module 146 may also determine if the crash event involving vehicle 102 has resulted in a probable total loss of vehicle 102. A determined probable total loss of vehicle 102 may correlate to vehicle 102 being a total loss, commonly referred to as "totaled" or a "write-off," rendering vehicle 102 non-repairable by insurance and/or operational standards. Damage cost module 146 determine vehicle 102 is a probable total loss by calculating a value of the vehicle prior to the crash event, and comparing the calculated value of vehicle 102 with the estimated damage cost to vehicle 102. Where the estimated damage cost to vehicle 102 exceeds a predetermined percentage (e.g., 75%) of the calculated value of vehicle 102, damage cost module 146 may determine vehicle 102 is a probable total loss. In a non-limiting example where a probable total loss is determined, vehicle 102 may not be repaired and/or may not be covered by an insurance carrier, and vehicle 102 may be sent directly to auction for salvage. In another non-limiting example where a probable total loss is not determined (e.g., does not exceed the predetermined percentage), vehicle 102 may be sent directly to a repair our auto body shop for repairs. The value of vehicle 102 may be calculated by damage cost module 146 using information specific to vehicle 102 (e.g., vehicle make, vehicle model, vehicle model year, mileage, previous accidents, and so on), and monetary information specific to vehicle 102 stored on vehicle information storage device 148.

The information received, determined, calculated, and/or generated by vehicle damage system 140, as discussed herein, may be provided in a notification to one or more of the predetermined group of users 104A-104N. That is, and as discussed herein with respect to notification system 132, information processed and/or determined by vehicle damage system 140 may be provided to a user via a notification. In a non-limiting example, the notification including the information from vehicle damage system 140 may be provided to the user's electronic device 138 over network 108. In the non-limiting example, the notification may be originate from vehicle damage system 140, or alternatively, vehicle damage system 140 may send the notification to notification system 132, which may in turn transmit the notification the user(s) via network 108.

As shown in FIG. 1, analysis system 106 may also include an occupant injury system 150. Occupant injury system 150 may be configured to analyze the information detected, obtained and/or calculated relating to the crash event, and instantaneously estimate injuries to an occupant of vehicle 102 involved in the crash event. Occupant injury system 150 may include an occupant crash force module 152 for processing information relating to vehicle 102 involved in the crash event and determining injury information relating to the occupant of vehicle 102 involved in the crash event. Occupant injury system 150 may also include an injury probability module 154 for determining an injury probability for the occupant of vehicle 102 based, at least in part, on the information relating to vehicle 102 involved in the crash event, and determined injury information relating to the occupant of vehicle 102, as determined by occupant crash force module 152. Additionally, occupant injury system 150 may also include vehicle information storage device 148, similar to vehicle damage system 140, which may contain information relating to vehicle 102 utilized by the various modules of occupant injury system 150, as discussed herein. Also shown in FIG. 1, and discussed herein, occupant injury system 150 may include occupant information storage device 156 which may contain information relating to an occupant of vehicle 102 utilized by the various modules of occupant injury system 150 to estimate injuries to occupant of vehicle 102.

Occupant crash force module 152 of occupant injury system 150 may perform similar operations as distinct modules of TCU 110, notification system 132 and/or vehicle damage system 140. In a non-limiting example, occupant crash force module 152 may receive data from TCU 110 relating to vehicle 102 involved in the crash event and may process and/or analyze the acceleration data to determine a change in speed or velocity of the vehicle 102 involved in the crash event, and crash force information (e.g., amount of crash force exerted and/or a direction of the crash) for vehicle 102, as discussed herein with respect to EDRC 128, crash discrimination module 134 and/or vehicle crash force module 142. Additionally, in the non-limiting example, occupant crash force module 152 may determine vehicle information relating to vehicle 102 involved in the crash event, similar to physical-damage module 144 of vehicle damage system 140. As discussed herein with respect to physical-damage module 144, the determining of vehicle information may include obtaining vehicle-specific information relating to vehicle 102 from vehicle information storage device 148, and/or calculating an anticipated crush deformation of vehicle 102.

In another non-limiting example, occupant crash force module 152 of occupant injury system 150 may obtain the information received, determined, calculated and/or obtained by distinct modules of notification system 132 and/or vehicle damage system 140. That is, occupant crash force module 152 may not perform similar operations, but rather, may obtain the information provided by modules (e.g., EDRC 128, crash discrimination module 134, vehicle crash force module 142, physical-damage module 144, and so on) of TCU 110, notification system 132 and/or vehicle damage system 140 for estimating injuries to an occupant of vehicle 102 involved in the crash event.

Occupant crash force module 152 of occupant injury system 150 may also be configured to determine occupant information relating to the occupant of vehicle 102 involved in the crash event. In a non-limiting example, the determining of the occupant information may include obtaining occupant specific information for the occupant of the vehicle 102. The occupant specific information may be set up by a user, and may be based on the user's personal characteristics and information. The occupant specific information for the occupant may include, but is not limited to, information pertaining to the occupant's height, the occupant's age, the occupant's gender, the occupant's weight, and so on. The occupant specific information may be stored within occupant information storage device 156.

In another non-limiting example, the determining of the occupant information may include, obtaining predetermined, standardized occupant information. Distinct from the occupant specific information discussed above, the predetermined, standardized occupant information may be generic and/or average information relating to an average occupant of vehicle 102. The predetermined, standardized occupant information that may be obtained may include information relating to an average occupant based, at least in part, on the gender, the age and/or the stature of the actual occupant of vehicle 102. In a non-limiting example, the predetermined, standardized occupant information may be information relating to the 50$^{th}$ percentile of an occupant having a similar gender. In another non-limiting example, where more information is known about the occupant, the predetermined, standardized occupant information may be information relating to a more specific percentile (e.g., 5$^{th}$ percentile, or 95$^{th}$ percentile) of an occupant having a similar gender, to more closely model the occupant information for processing, as discussed herein. The predetermined, standardized occupant information may be stored within occupant information storage device 156.

In determining occupant information relating to the occupant of vehicle 102, occupant crash force module 152 may also determine if the occupant wore a seat belt during the crash event, and/or determine the positioning of a seat in vehicle 102 utilized by the occupant. In a non-limiting example, TCU 110 in electrical communication with OBD system 112 of vehicle 102 may determine and transmit information pertaining to the use of a seat belt by the occupant and the position of the seat utilized by the occupant within vehicle 102. In a non-limiting example, the seat position may be estimated based on occupant specific information, such as, but not limited to, the height of the occupant, the weight of the occupant, the age of the occupant, the gender of the occupant and so on. In another non-limiting example, and similar to predetermined, standardized occupant information, the position of the seat utilized by the occupant within vehicle 102 may include a standardized, generic and/or average seat position for the seat in vehicle 102.

Occupant crash force module 152 of occupant injury system 150 may also determine or obtain pre-solved crash information for vehicle 102. The pre-solved crash information for vehicle 102 may be based, at least in part, on the acceleration of the vehicle, the change in velocity of the vehicle, and vehicle-specific information, as discussed herein. Using the obtained, calculated and/or determined information relating to the crash event involving vehicle 102, pre-solved crash information may include pre-solved or predetermined crash force information (e.g., amount of crash force and/or direction of the crash force) which may provide substantially similar vehicle-specific crash information for vehicle 102 involved in the crash event. This pre-solved crash information may be pre-solved and/or predetermined for a plurality of vehicles, including vehicle 102, having crashes involving a distinct crash event information (e.g., change in speed, acceleration, and the like). The pre-solved crash information may be stored in a library on a storage device, such as vehicle information storage device 148.

Injury probability module 154 may calculate estimated forces exerted on the occupant of vehicle 102 during the crash event. More specifically, injury probability module 154 may calculate estimated forces exerted on the occupant of vehicle 102 based, at least on, the acceleration data relating to vehicle 102, the change in the speed of vehicle 102, the determined occupant information and the determined pre-solved crash information for vehicle 102. In a non-limiting example, injury probability module 154 may calculate the estimated forces exerted on the occupant using the received/determined information from occupant crash force module 152, and subsequently using the received/determined information to conduct a crash victim simulation. In the non-limiting example, the crash victim simulation may utilize the received/determined information from occupant crash force module 152 and provide estimated forces exerted on distinct portions and/or body parts of the occupant during the crash event.

Based on the estimated forces exerted on the occupant of vehicle 102 during the crash event, and the occupant information, injury probability module 154 may also calculate an injury probability for the occupant of vehicle 102. In a non-limiting example, the estimated forces exerted on the occupant of vehicle 102 may be compared to predetermined injury thresholds specific to occupants having similar characteristics of the occupant of vehicle 102. The predetermined injury thresholds may define a probability of injury or estimate a likelihood of injury to an occupant based on a predetermined exerted force during a crash event. Additionally, the predetermined injury thresholds may define the probability of injury or estimate the likelihood of injury to distinct portions and/or body parts of the occupant during the crash event. In non-limiting examples, the likelihood of injury to the distinct portions or body parts of the occupant involved in the crash event may include, but is not limited to, the likelihood of injury to the occupants head, neck, chest and lower extremities (e.g. legs, feet and so on). By comparing the estimated forces exerted on the occupant of vehicle 102 with the predetermined injury thresholds, injury probability module 154 may calculate the injury probability for the occupant of vehicle 102 involved in the crash event.

Although discussed herein as estimating injuries to an occupant of vehicle 102 involved in a crash event, it is understood that injuries may be estimated for multiple occupants of vehicle 102. That is, the processes discussed herein with respect to occupant injury system 150 may be performed for every occupant of vehicle 102 to estimate injuries for all occupants involved in the crash event.

Similar to vehicle damage system 140, the information received, determined, calculated, and/or generated by occupant injury system 150, as discussed herein, may be provided in a notification to one or more of the predetermined group of users 104A-104N. That is, and as discussed herein with respect to notification system 132, information processed and/or determined by occupant injury system 150 may be provided to a user via a notification. In a non-limiting example, the notification including the information from occupant injury system 150 may be provided to the user's electronic device 138 over network 108. In the non-limiting example, the notification may be originate from occupant injury system 150, or alternatively, occupant injury system 150 may send the notification to notification system 132, which may in turn transmit the notification the user(s) via network 108.

Although shown as being distinct systems as part of analysis system 106, it is understood that the modules and/or storage devices of notification system 132, vehicle damage system 140 and/or occupant injury system 150 may be integrated or included in a single system. Additionally, one or more of the systems (e.g., notification system 132, vehicle damage system 140 and/or occupant injury system 150) may be integrated or included within TCU 110, and may operate and function as discussed herein in a similar fashion when integrated or included within TCU 110.

Figure 4:
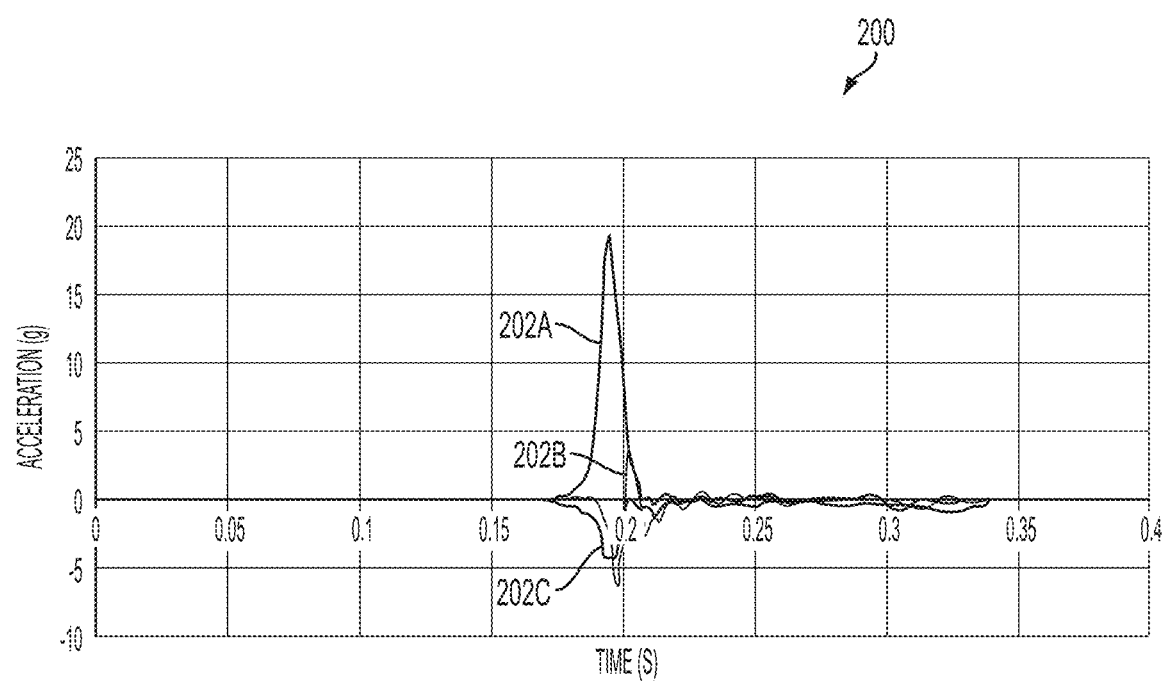
FIG. 4 depicts an exemplary graph of multi-axis acceleration data of a vehicle involve in a crash event, according to embodiments.

FIG. 4 depicts a non-limiting example of multi-axis or multi-orthogonal direction acceleration data 200 relating to vehicle 102 (see, FIG. 1) involved in a crash event. As discussed herein, multi-axis acceleration data 200 may be detected by accelerometer(s) 124 of TCU 110 (see, FIGS. 1 and 2). In the non-limiting example shown in FIG. 4, multi-axis acceleration data 200 may include acceleration data 202 of vehicle 102 in a variety of directions; specifically, acceleration data 202a in a first direction, acceleration data 202b in a second direction, and acceleration data 202c in a third direction. As discussed herein, the acceleration data 200 may be analyzed, compared and/or utilized to determine the acceleration of vehicle 102, the change in speed of vehicle 102, the displacement of vehicle 102, the amount of force exerted on vehicle 102, the direction of the force exerted on vehicle 102, the physical-damage characteristics (e.g., crush deformation) of vehicle 102, and so on.

Although three directions of acceleration data 200 are shown in FIG. 4, it is understood that more or less directions of acceleration data may be determined by accelerometer 124 of TCU 110 during a crash event involving vehicle 102. As discussed herein, although not shown, a gyroscope (e.g., sensor 126) may be utilized to provide similar multi-directional information to analyze the crash event involving vehicle 102. In the non-limiting example, gyroscope of TCU 110 may provide information relating to the angular rotation of vehicle 102 about three axes or directions, which may aid in analyzing the crash event.

Figure 5A:
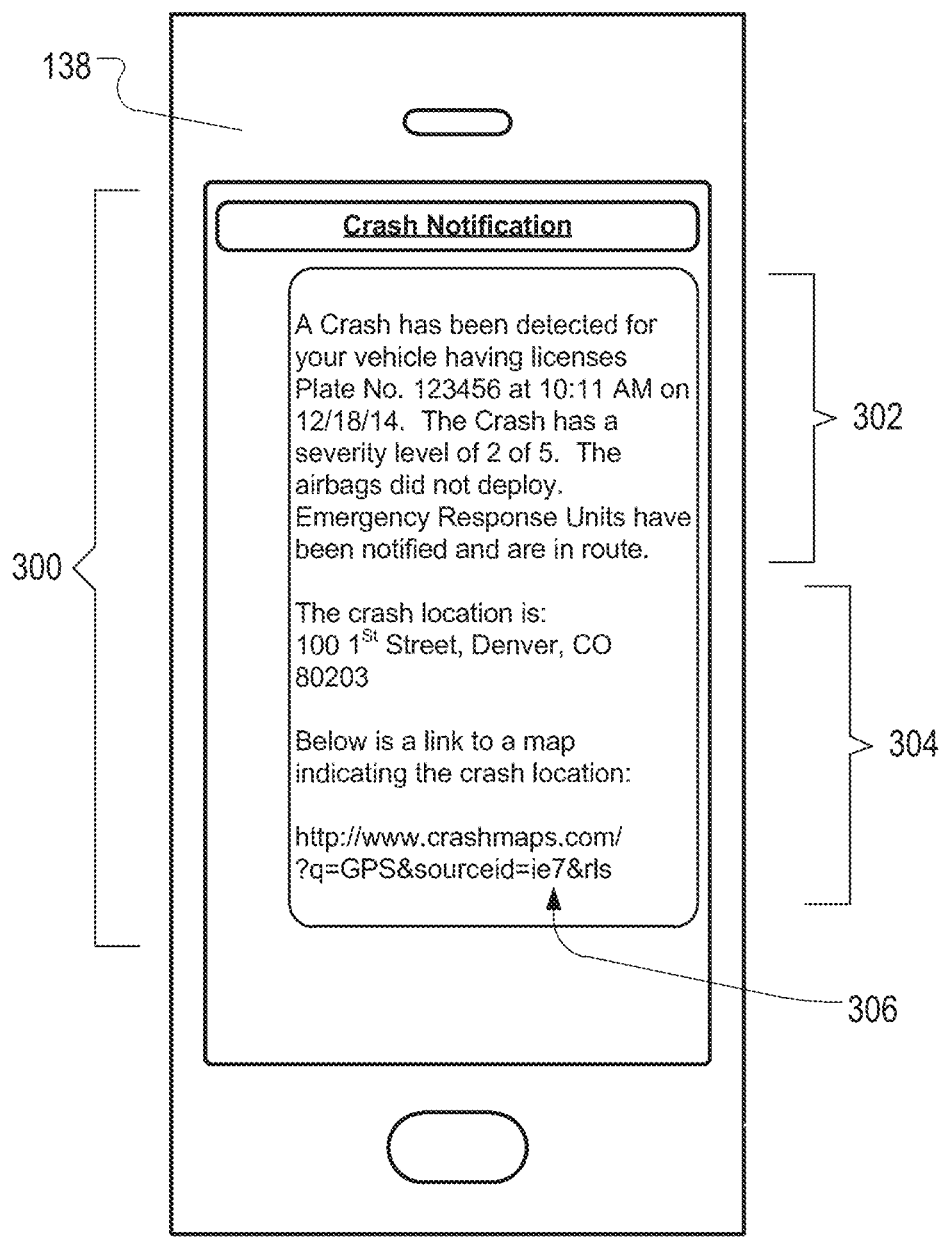
FIGS. 5A and 5B depict illustrative views of a notification relating to a crash event sent to an electronic device, according to embodiments.
Figure 5B:
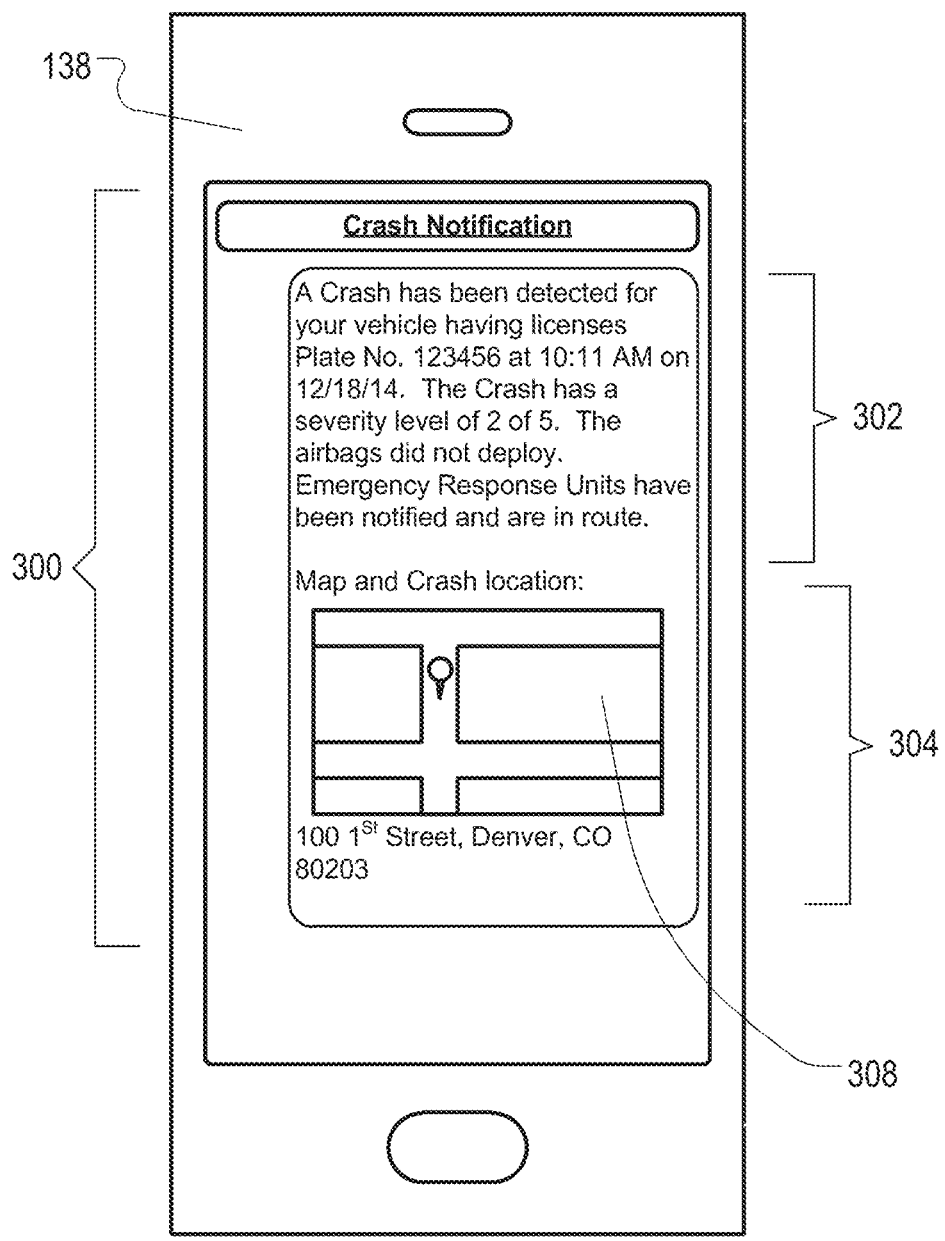

FIGS. 5A and 5B depict non-limiting examples of notifications 300 being provided to electronic device 138 associated with user 104 (see, FIG. 1). As shown in FIGS. 5A and 5B, electronic device 138 may be depicted as a handheld electronic device (e.g., mobile phone, tablet, and so on). In the non-limiting examples of FIGS. 5A and 5B, the notification 300 provided to electronic device 138 may include crash information 302 relating to a crash event involving vehicle 102 associated with electronic device 138 and/or user of electronic device 138. As discussed herein, crash information 302 may include, but is not limited to, information relating to a detection of a crash, vehicle information, a time of the crash event, a date of the crash event, a detected/determined severity level of the crash, if airbags deployed, whether emergency response units have been notified and the like.

Additionally in the non-limiting examples shown in FIGS. 5A and 5B, notification 300 may also include crash location information 304. Crash location information 304 may include a location (e.g., an address) of the crash event involving vehicle 102. In the non-limiting example shown in FIG. 5A, the crash location information 304 may also include a hyperlink to a map to provide a visual of the location of the crash event involving vehicle 102. The hyperlink may open a web browser map, or alternatively may open a map application ("app") of electronic device 138. In another non-limiting example shown in FIG. 5B, a map graphic 308 may be included in the crash location information 304, providing the user of electronic device 138 with a visual of a location of the crash event involving vehicle 102.

Figure 6:
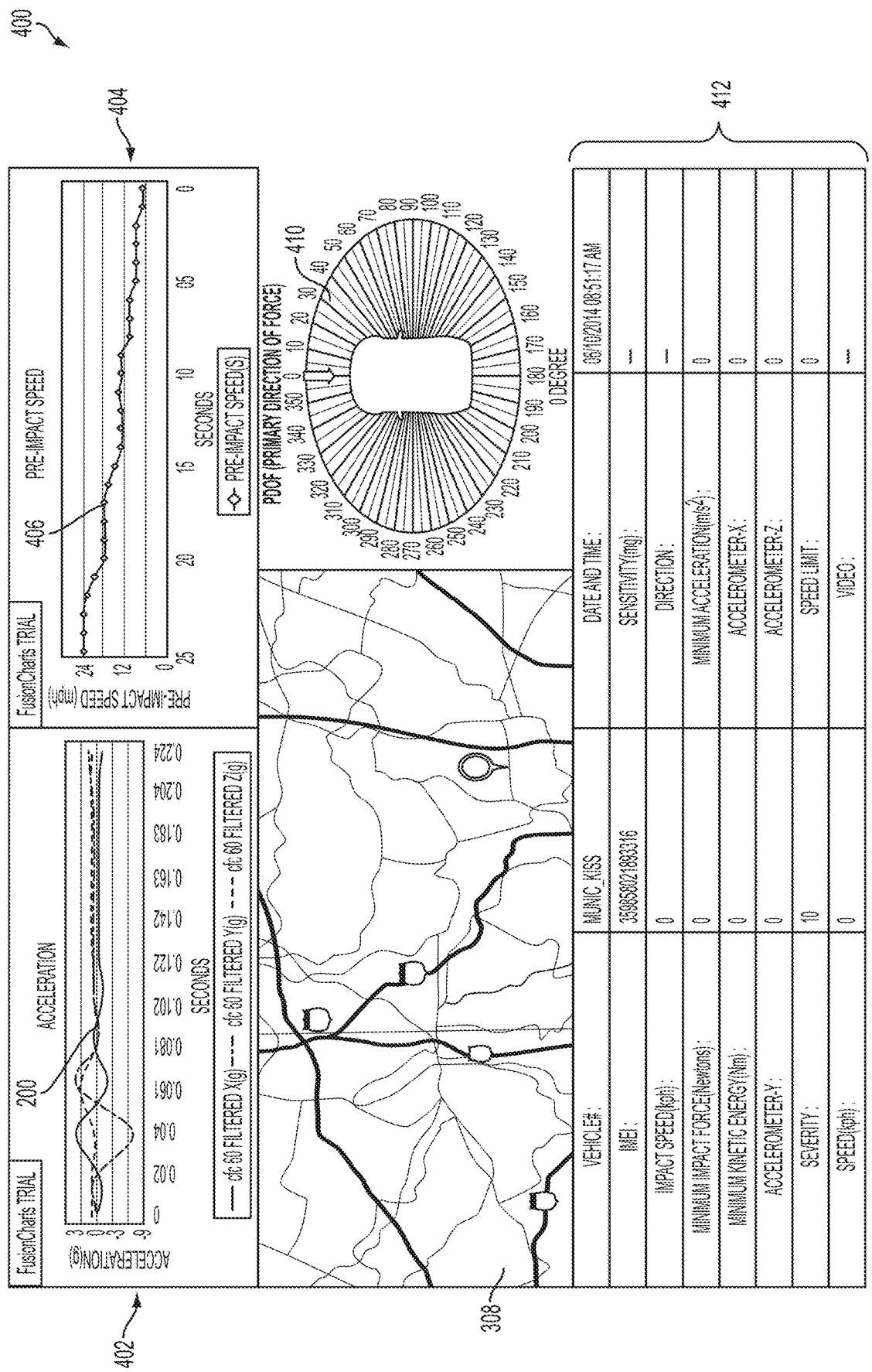
FIG. 6 depicts exemplary notifications relating to a crash event, according to additional embodiments.

FIG. 6 depicts a non-limiting example of an additional notification 400 relating to vehicle 102 (see, FIG. 1) involved in a crash event. As discussed herein, notification 400 may be sent to electronic device 138 of user 104. In the non-limiting example shown in FIG. 6, notification 400 may include various forms of information related to distinct information for the crash event involving vehicle 102. For example, notification 400 may provide a linear graph 402 depicting the multi-axis or multi-orthogonal direction acceleration data 200, as discussed herein with respect to FIG. 4, and a distinct linear graph 404 depicting pre-impact speed 406 of vehicle 102 prior to the crash event. Additionally, notification 400 may include a map 308 depicting a location of the crash event involving vehicle 102. Furthermore in the non-limiting example notification 400 may include directional crash force indicator 410, which may depict the direction and/or angle of the crash force exerted on vehicle 102 during the crash event. Finally, notification 400 may include additional crash information 412 relating to the crash event involving vehicle 102. The additional crash information 412 may include, but is not limited to, information relating to a detection of a crash, vehicle information, a time of the crash event, a date of the crash event, a detected/determined severity level of the crash, if airbags deployed, whether emergency response units have been notified and the like.

FIG. 7 depicts a non-limiting example of another notification 500 relating to vehicle 102 (see, FIG. 1) involved in a crash event. Notification 500 may include vehicle information 502, relating to vehicle-specific information (e.g., vehicle make, vehicle model, vehicle model year, and so on) for vehicle 102, and crash event information 504 relating to the crash event involving vehicle 102, as similarly discussed herein with respect to crash information 302 in notification 300 (see, FIGS. 5A and 5B) and additional crash information 412 in notification 400 (see, FIG. 6). Notification 500 may also include a map 308 depicting a location of the crash event involving vehicle 102, and directional crash force indicator 410, which may depict the direction and/or angle of the crash force exerted on vehicle 102, as similarly discussed herein with respect to FIGS. 5B, and/or 6.

As shown in FIG. 7, notification 500 may also include a visual 506 depicting the severity of the damage to vehicle 102 involved on the crash event. In a non-limiting example, visual 506 may include a picture of a vehicle similar to vehicle 102 that may have undergone a similar crash event having similar crash event perimeters and/or determined information (e.g., acceleration, speed, crash force, direction of crash force and so on). The picture of the similar vehicle undergoing a similar crash event may be stored on a storage device and obtained after the vehicle information 502 and/or crash event information 504 is determined. In another non-limiting example, visual 506 may depict an actual image of vehicle 102 after the crash event, where an occupant of vehicle 102 submits a picture of vehicle 102. In a further non-limiting example, visual 506 may be a computer generated or rendered based on the vehicle information 502 and/or crash event information 504 using any suitable graphic or animation software. The visual 506 may utilized to compare damage to vehicle 102 with a similar crash event involving a vehicle identical to vehicle 102 and/or to provide a visual of the damage to a user unable to see vehicle 102 after the occurrence of the crash event.

Notification 500 may also include estimated damage cost information 508 relating to an estimated damage cost for repairing and/or replacing damaged parts of vehicle 102 involved in the crash event. As discussed herein, the estimated damage cost information 508 may be determined using vehicle damage system 140 and information determined, received, obtained and/or calculated using vehicle damage system 140 and/or TCU 110 of vehicle 102 (see, FIG. 1).

In the non-limiting example shown in FIG. 7, notification 500 may also include a bill of materials (BOM) 510. BOM 510 may provide a chart which may include the parts and/or components of vehicle 102 that may be damaged in the crash event. Additionally BOM 510 may include a part count for the number of parts and/or components of vehicle 102 that may be damaged in the crash event. Although not shown, BOM 510 may also include cost or fees associated with services to be performed on vehicle 102 involved in the crash event. In non-limiting examples, BOM 510 may also include cost estimations associated with services such as new paint for vehicle 102 and/or repair services (e.g., frame straightening, tire realignment, and so on) that may not include the need to repair and/or replace a part of vehicle 102.

FIG. 8 depicts another non-limiting example of BOM 510A. As shown in FIG. 8, BOM 510A may include parts and/or components and a parts count for the parts and/or components of vehicle 102 that may be damaged in the crash event. Additionally, BOM 510A may include estimated costs for repairing and/or replacing the damaged parts and/or components of vehicle 102 involved in the crash event. As shown in the non-limiting example of FIG. 8, BOM 510A may depict some parts that include both an estimated cost to repair and replace, and some parts that may only be repaired or replaced. As discussed herein, crash information relating to vehicle 102 involved in the crash event may determine which parts and/or components may be repaired and/or replaced.

Figure 9:
FIG. 9 depicts an exemplary notifications relating a total loss for a vehicle involved in a crash event, according to embodiments.

FIG. 9 shows an additional notification 550. Notification 550 may include information relating to a total loss of vehicle 102 involved in the crash event. As discussed herein, total loss of vehicle 102 may be calculated to determine if vehicle 102 is capable of being repaired for use after the crash, or if vehicle 102 may not be repaired. As shown in FIG. 9, and as discussed herein, an estimated repair cost to return vehicle 102 to the pre-crash condition may be compared to an actual value of vehicle 102 prior to the crash event. Where the estimated repair cost equals and/or exceeds a predetermined percentage of the actual value of the vehicle 102, vehicle 102 may be deemed a total loss and may be sent to an auction for salvage, as discussed herein. Conversely, where the estimated repair cost does not exceed a predetermined percentage of the actual value of the vehicle 102, vehicle 102 may not be deemed a total loss and may be sent directly to a repair shop.

Figure 10:
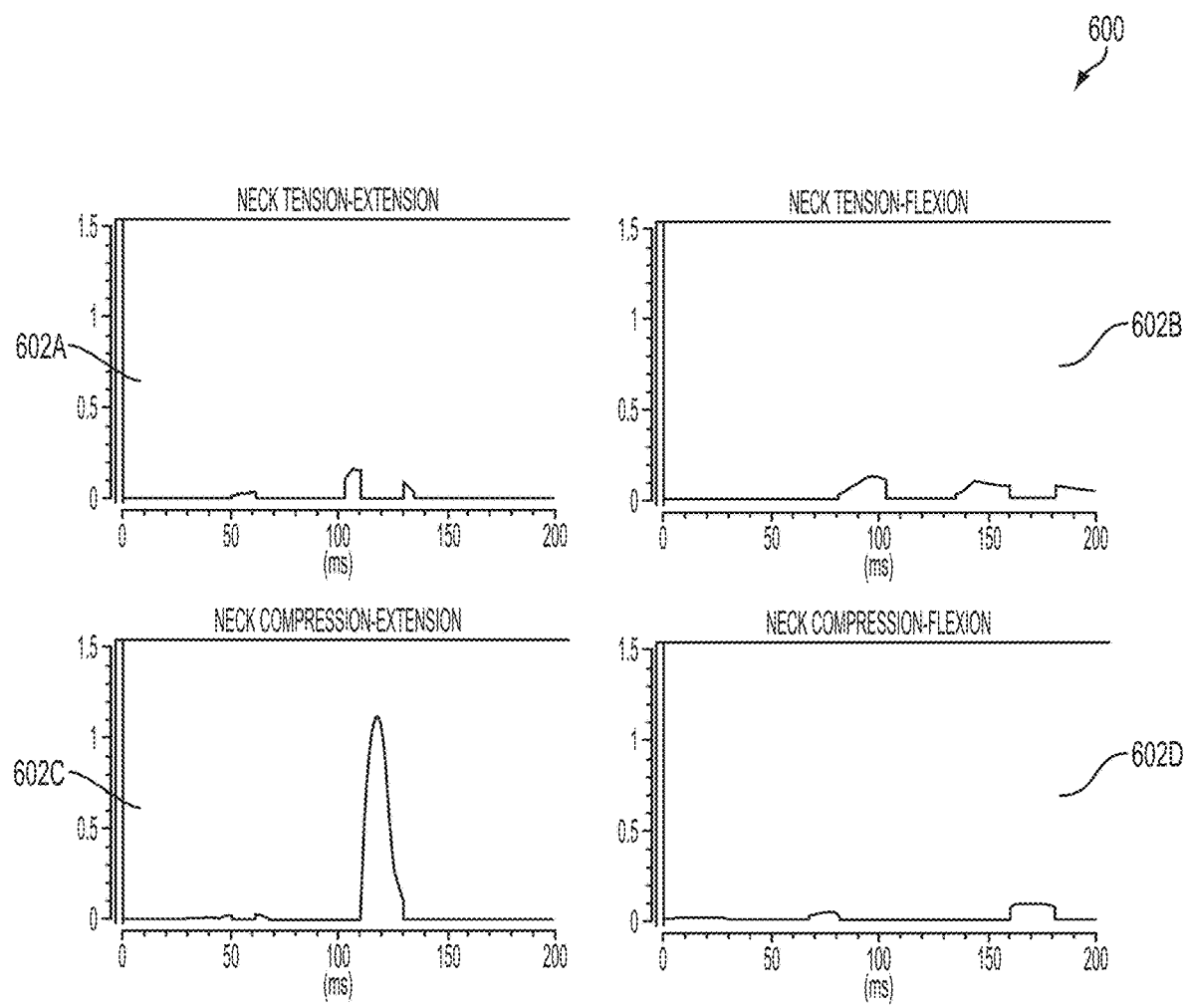
FIG. 10 depicts exemplary graphs of crash victim simulation data for an occupant of a vehicle involved in a crash event, according to embodiments.

FIG. 10 depicts non-limiting examples of crash victim simulation data 600 for an occupant of vehicle 102 (see, FIG. 1) involved in a crash event. As discussed herein, crash victim simulation data 600 may be determined and/or generated using crash event information relating to the crash event involving vehicle 102, information relating to vehicle 102 and information relating to the occupant of vehicle 102 (see, FIGS. 1 and 2). In the non-limiting example shown in FIG. 10, crash victim simulation data 600 may be represented in a set of linear graphs 602A-602D. Each linear graph may represent a distinct force application and/or distinct position/orientation of a respective portion or body part of the occupant, as determined during the crash victim simulation. In the non-limiting example shown in FIG. 10, graph 602A may represent the force exerted and/or the neck tension of an occupant involved in a crash event in an extension orientation. Additionally in the non-limiting example, graph 602B may depict measured neck tension in a flexion orientation, and graphs 602C and 602D may depict measure neck compression in an extension and flexion orientation, respectively. As discussed herein, the crash victim simulation data 600 may be analyzed, compared and/or utilized to estimate injuries of an occupant of vehicle 102 involved in the crash event.

Although only information relating to neck tension and compression is depicted in the non-limiting example of crash victim simulation data 600 shown in FIG. 49, it is understood that distinct portions and/or body parts of an occupant of vehicle 102 may also have similar data determined.

FIGS. 11A and 11B depict non-limiting examples of an injury probability notification 700, 710 relating to vehicle 102 (see, FIG. 1) involved in a crash event. In the non-limiting examples, injury probability notification 700, 710 may depict a probability and/or likelihood of injury for an occupant of vehicle 102 involved in the crash event, as discussed herein. Injury probability notification 700, 710 may provide a probability or likelihood of injury for various body portions or parts (e.g., head, neck, chest and so on) of the occupant of vehicle 102 involved in the crash event. In the non-limiting example shown in FIG. 11A, the likelihood of injury provided in the injury probability notification 700 may be expressed using a percentage of injury, Specifically, as shown in FIG. 11A, injury probability notification 700 may be represented as the Abbreviated Injury Scale (AIS).

In another non-limiting example shown in FIG. 11B, the likelihood of injury provided in the injury probability notification 710 may be a verbal range ranging from "very low" to "very high" (not shown). In another non-limiting example, the probability and/or likelihood of injury may be provided using a numerical scale, for example, 1 to 10. As discussed herein, the probability and/or likelihood of injury may be based, at least in part, on the received acceleration of vehicle 102, the determined occupant information, the determined vehicle information and/or the calculated estimated forces exerted on the occupant, as determined in a crash victim simulation.

Figure 12:
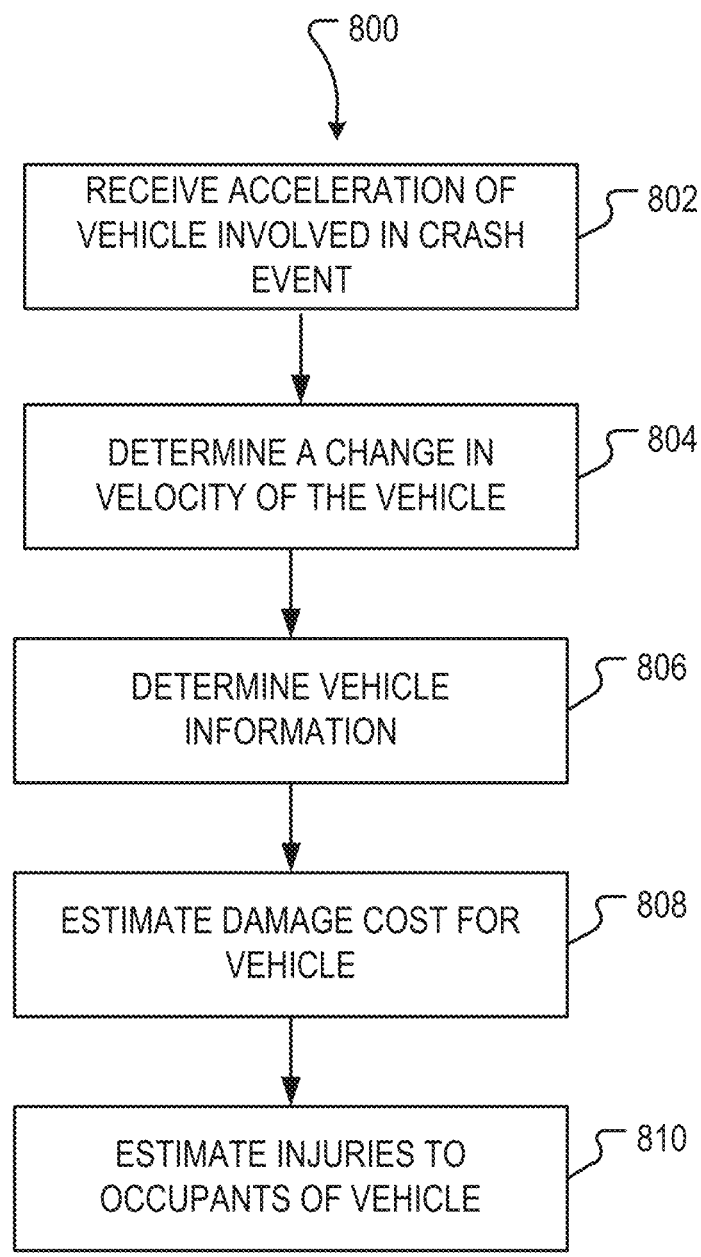
FIG. 12 depicts a flow chart illustrating a method of analyzing a crash event involving a vehicle. The method may be performed by the detection system depicted in FIGS. 1-3.

FIG. 12 depicts an example process for analyzing a crash event. Specifically, FIG. 12 is a flowchart depicting one example process 800 for analyzing a crash event involving a vehicle and/or an occupant of the vehicle. In some cases, the process of analyzing a crash event may be performed using the analysis system, discussed above with respect to FIGS. 1-3.

In operation 802, acceleration data relating to the acceleration of a vehicle over a predetermined length of time may be received. The vehicle may be involved in the crash event. The receiving of the acceleration of the vehicle may also include receiving multi-axis acceleration data from at least one accelerometer positioned on the vehicle. The acceleration may be automatically received subsequent to the occurrence of the crash event.

In operation 804, a change in the velocity or speed of the vehicle involved in the crash event may be determined. The determined change in speed may include the change in velocity from prior to the crash event, through the end of the crash event. The determining of the change in speed may be based, at least in part, on the received acceleration.

In operation 806, vehicle information relating to the vehicle involved in the crash event may be determined. The determining of the vehicle information may also include obtaining vehicle-specific crash information relating to the vehicle involved in the crash event, and calculating an anticipated crush deformation of the vehicle. Further, the determining of the vehicle information may include obtaining standardized crash information for the vehicle using the received acceleration of the vehicle.

In operation 808, a damage cost for the vehicle involved in the crash event may be estimated. The estimating of the damage cost of the vehicle may include determining crash force information (e.g., amount of exerted crash force, direction of the crash force) for the vehicle during the crash event based, at least in part, on the acceleration of the vehicle and the change in speed or velocity of the vehicle, and determining physical-damage characteristics of the vehicle subsequent to the crash event based, at least in part, on the acceleration of the vehicle, the change in speed and/or the crash force information. Additionally, the estimating of the damage cost of the vehicle may also include calculating the estimated damage cost to the vehicle involved in the crash event based on the determined crash force information for the vehicle, and/or the determined physical-damage characteristics of the vehicle.

In operation 810, injuries to the occupant of the vehicle involved in the crash event may be estimated. The estimating of the injuries to the occupant may include determining occupant information relating to the occupant of the vehicle involved in the crash event, and calculating estimated forces exerted on the occupant during the crash event. The calculating of the estimated forces may be based on the detected acceleration of the vehicle, the change in speed of the vehicle, the determined occupant information relating to the occupant, and/or the determined crash force information (e.g., amount of exerted crash force, direction of the crash force) for the vehicle. The estimating of the injuries to the occupant may also include calculating an injury probability for body portions (e.g., head, neck, chest, and the like) for the occupant of the vehicle based on the estimated forces exerted on the occupant.

Although shown in such an order where operation 808 precedes operation 810, it is understood that operation 808 may be performed after operation 810, or may be performed simultaneously as operation 810. Additionally, it should be understood that operation 808 or operation 810 may not be required to be performed when analyzing the crash event in process 800. The performing of operation 808 and/or operation 810 may be dependent upon the information that may be desired to be obtained when analyzing a crash event involving a vehicle under the process 800.

Figure 13:
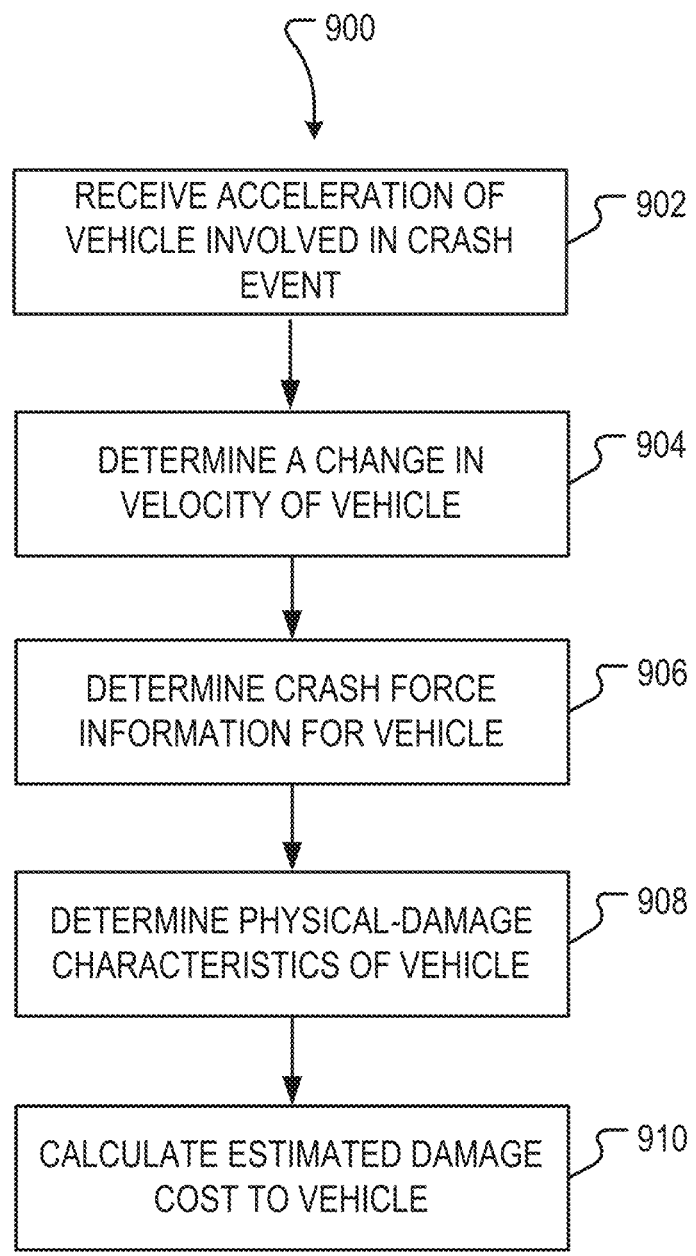
FIG. 13 depicts a flow chart illustrating a method of instantaneously estimating a damage cost to a vehicle involved in a crash event. The method may be performed by the detection system depicted in FIGS. 1-3.

FIG. 13 is a flowchart depicting one example process 900 for instantaneously estimating a damage cost for a vehicle involved in a crash event. In some cases, the process of analyzing a crash event may be performed using the analysis system, discussed above with respect to FIGS. 1-3.

In operation 902, acceleration data relating to the acceleration of a vehicle over a predetermined length of time may be received. The vehicle may be involved in the crash event. The receiving of the acceleration of the vehicle may also include receiving multi-axis acceleration data from at least one accelerometer positioned on the vehicle.

In operation 904, a change in the velocity or speed of the vehicle involved in the crash event may be determined. The determined change in speed may include the change in velocity from prior to the crash event, through the end of the crash event. The determining of the change in speed may be based, at least in part, on the received acceleration.

In operation 906, crash force information for the vehicle involved in the crash event based, at least in part, on the acceleration and/or the change in speed of the vehicle may be determined. The determining of the crash force information for the vehicle may include analyzing and comparing each of the multi-axis acceleration data received from the at least one accelerometer, and the change in the velocity or speed of the vehicle to determine a crash force applied to the vehicle involved in the crash event, and to determine a direction of the crash force applied to the vehicle.

In operation 908, physical-damage characteristics of the vehicle subsequent to the crash event may be determined. The physical damage characteristic may be based, at least in part, on the acceleration of the vehicle, the change in speed of the vehicle and/or the crash force information. The determining of the physical-damage characteristics may also include obtaining vehicle-specific crash information relating to the vehicle involved in the crash event, and calculating an anticipated crush deformation of the vehicle. The calculated crush deformation may be based on the determined crash force information, the acceleration and/or change in speed of the vehicle, and/or the determined vehicle information.

In operation 910, the estimated damage cost to the vehicle involved in the crash event may be calculated. The estimated damage cost may be calculated based on the determined crash force information for the vehicle, and/or the determined physical-damage characteristics of the vehicle. Additionally, the calculating of the estimated damage cost may also include determining a first cost associated with repairing damaged parts of the vehicle involved in the crash, and determining a second cost associated with replacing the damaged parts of the vehicle involved in the crash.

Although not shown, process 900 may include further operations. In a non-limiting example, process 900 may also include generating a bill of materials (BOM) based on the estimated damage cost to the vehicle. The BOM may include a list of the damaged parts of the vehicle, the first cost associated with repairing the damaged parts, the second cost associated with replacing the damaged parts, and/or a total cost to repair and/or replace the damaged parts.

Additionally, process 900 may also include calculating a value of the vehicle prior to the crash event, comparing the calculated value of the vehicle with the estimated damage cost to the vehicle, and determining a probable total loss of the vehicle where the estimated damage cost exceeding a predetermined percentage of the calculated value of the vehicle.

Figure 14:
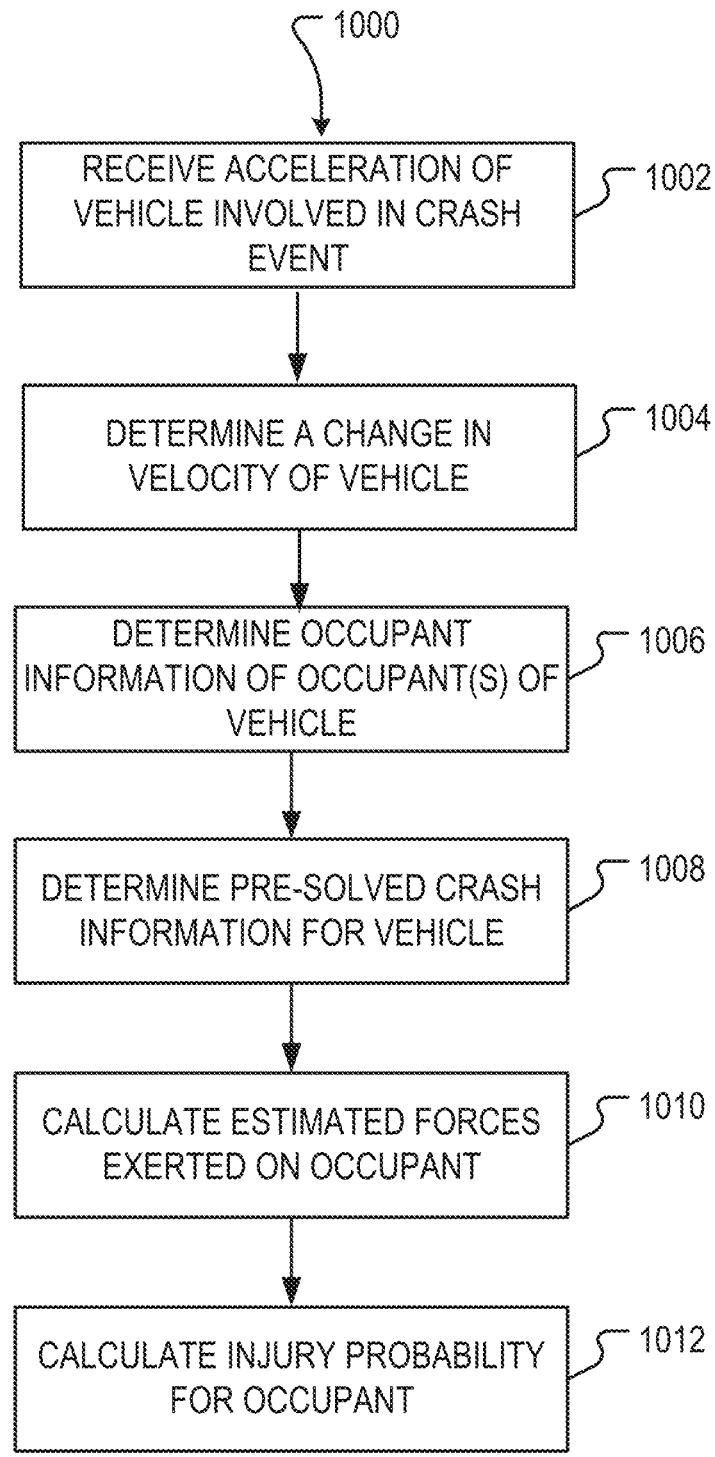
FIG. 14 depicts a flow chart illustrating a method of instantaneously estimating injuries to an occupant of a vehicle involved in a crash event. The method may be performed by the detection system depicted in FIGS. 1-3.

FIG. 14 is a flowchart depicting one example process 1000 for instantaneously estimating injuries to an occupant of a vehicle involved in a crash event. In some cases, the process of analyzing a crash event may be performed using the analysis system, discussed above with respect to FIGS. 1-3.

In operation 1002, acceleration data relating to the acceleration of a vehicle over a predetermined length of time may be received. The vehicle may be involved in the crash event. The receiving of the acceleration of the vehicle may also include receiving multi-axis acceleration data from at least one accelerometer positioned on the vehicle.

In operation 1004, a change in the velocity or speed of the vehicle involved in the crash event may be determined. The determined change in speed may include the change in velocity from prior to the crash event, through the end of the crash event. The determining of the change in speed may be based, at least in part, on the received acceleration.

In operation 1006, occupant information relating to the occupant of the vehicle involved in the crash event may be determined. The determining of the occupant information may include obtaining occupant specific information for the occupant and/or obtaining predetermined, standardized occupant information based on at least one of the gender and age of the occupant. Additionally, the determining of the occupant information may include determining if the occupant wore a seat belt during the crash event, and/or determining the positioning of a seat in the vehicle utilized by the occupant.

In operation 1008, pre-solved crash information for the vehicle involved in the crash event may be determined. The pre-solved crash information may be based, at least in part, on the acceleration of the vehicle and the change in speed or velocity of the vehicle. The determining of the pre-solved crash information may also include obtaining vehicle-specific crash information relating to the vehicle involved in the crash event, and calculating an anticipated crush deformation of the vehicle. The calculating of the anticipated crush deformation may be based on the received acceleration of the vehicle, a determined direction of the crash force applied to the vehicle, and/or the determined vehicle information. The determining of the pre-solved crash information relating to the vehicle may further include obtaining the pre-solved crash information from a library of pre-solved crash information for a plurality of distinct vehicles.

In operation 1010, estimated forces exerted on the occupant of the vehicle may be calculated. The calculating of the estimated forces exerted on the occupant may be based on the acceleration of the vehicle, the change in the velocity of the vehicle, the determined occupant information relating to the occupant, and/or the determined pre-solved crash information.

In operation 1012, an injury probability for body portions (e.g., head, neck, chest, and the like) for the occupant of the vehicle based on the estimated forces exerted on the occupant may be calculated.

Figure 15:
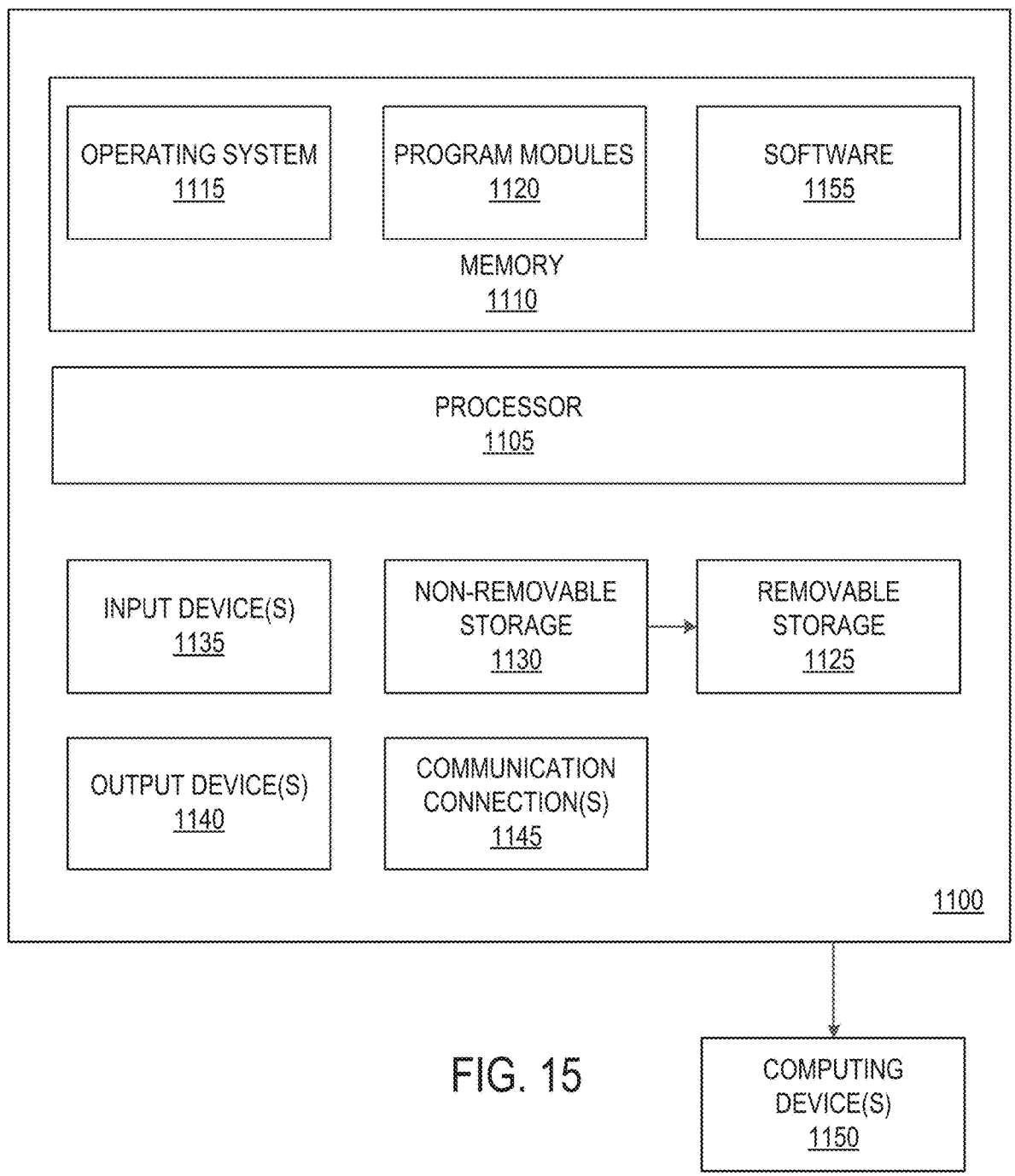
FIG. 15 depicts an illustrative block diagram example of physical components of a computing device that may be used with one or more embodiments.

FIG. 15 is a block diagram illustrating exemplary components, such as, for example, hardware components of a computing device 1100 according to one or more embodiments of the present disclosure. In certain embodiments, the computing device 1100 may be similar to the computing devices used by the various users of the system 100. Further, the computing device 1100 may be similar to the analysis system 106 shown and described with respect to FIG. 1. Although various components of the computing device 1100 are shown, connections and communication channels between each of the components are omitted for simplicity.

In a basic configuration, the computing device 1100 may include at least one processor 1105 and an associated memory 1110. The memory 1110 may include, but is not limited to, volatile storage such as random access memory, non-volatile storage such as read-only memory, flash memory, or any combination thereof. The memory 1110 may store an operating system 1115 and one or more program modules 1120 suitable for running software applications 1155. The operating system 1115 may be configured to control the computing device 1100 and/or one or more software applications 1155 being executed by the operating system 1115. The program modules 1120 or software applications 1155 may include modules and programs similar to those modules discussed herein with respect to FIG. 1.

The computing device 1100 may have additional features or functionality than those expressly described herein. For example, the computing device 1100 may also include additional data storage devices, removable and non-removable, such as, for example, magnetic disks, optical disks, or tape. Exemplary storage devices are illustrated in FIG. 15 by removable storage device 1125 and a non-removable storage device 1130.

In certain embodiments, various program modules and data files may be stored in the system memory 1110. The program modules 1120 and the processor 1105 may perform processes that include one or more of the operations of methods 800, 900 and 1000 shown and described with respect to FIGS. 11-13.

As also shown in FIG. 15, the computing device 1100 may include one or more input devices 1135. The input devices 1135 may include a keyboard, a mouse, a pen or stylus, a sound input device, a touch input device, and the like. The computing device 1100 may also include one or more output devices 1140. The output devices 1140 may include a display, one or more speakers, a printer, and the like.

The computing device 1100 also includes communication connections 1145 that facilitate communications with additional computing devices 1150. Such communication connections 1145 may include internet capabilities, a RF transmitter, a receiver, and/or transceiver circuitry, universal serial bus (USB) communications, parallel ports and/or serial ports.

As used herein, the term computer readable media may include computer storage media. Computer storage media may include volatile and nonvolatile media and/or removable and non-removable media for the storage of information. Examples include computer-readable instructions, data structures, and program modules. The memory 1110, the removable storage device 1125, and the non-removable storage device 1130 are all examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100.

The detection system, and method for analyzing the crash event using the detection system may receive information or data relating to the crash event involving the vehicle just moments after the crash event occurred. Once the information relating to the crash event is received by the detection system, the information may be processed, analyzed, and/or compared, to instantaneously provide an estimated damage cost to the vehicle involved in the crash event, as well as, provide an instantaneous estimate for injuries suffered by occupant(s) of the vehicle. These instantaneous and/or "real-time" estimations and information relating to the crash event may be beneficial for an insurance carrier, who may provide, fast and accurate processing of an insurance claim. Additionally, using the instantaneous estimations and information insurance carriers may be able to process the claim more effectively and quickly, while reducing costs associated with fraudulent and exaggerated claims. The information may also be beneficial for a user who may have an interest (e.g., emergency services, fleet, vehicle owners, lessor and the like) in the vehicle involved in the crash event, to obtain the quickest, and most accurate information relating to the crash event. Finally, the detection system and process for analyzing the crash event may fully or completely automate the entire crash event involving the vehicle including the detection, analysis and/or reporting process. By automating (e.g., no human interaction or reliance) the process of crash reporting and analysis of the crash event, occupant health/safety may be improved, cost of insurance and processing may be reduced and the overall claims process may be more efficient for insurance carriers, fleets, government agencies or anyone operating a vehicle.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

We claim:

1. A vehicle, comprising:
a body having kinetic energy management characteristics and defining a passenger compartment; and a detection device rigidly attached to the body within the passenger compartment, the detection device comprising:
an accelerometer configured to measure acceleration along multiple axes of the vehicle;
a gyroscope configured to measure angular velocity of the vehicle;
a speed sensor configured to measure a rate of travel of the vehicle; and
a processing unit operatively coupled with the accelerometer, the gyroscope, and the speed sensor and configured to:
continuously monitor multi-axis acceleration data from the accelerometer;
analyze data received using the detection device to determine that a crash event has occurred;
in response to determining that the crash event has occurred, transmit a notification to a remote server, the notification including the multi-axis acceleration data of the accelerometer, angular velocity data of the gyroscope, and rate of travel data of the speed sensor, wherein:
the remote server is configured to:
access vehicle-specific information corresponding to the vehicle;
determine, using the multi-axis acceleration data of the accelerometer, angular velocity data of the gyroscope, and rate of travel data of the speed sensor:
a crash force received by the vehicle during the crash event; and
a direction of the crash force received by the vehicle; and
compute estimated physical damage of the vehicle using the vehicle-specific information, the determined crash force, and the direction of the crash force.

2. The vehicle of claim 1, wherein the accelerometer is configured to measure acceleration along:
a first axis corresponding to a direction of travel of the vehicle;
a second axis of the vehicle that is along an orthogonal plane to the first axis; and
a third axis of the vehicle that is along an orthogonal plane to the second axis.

3. The vehicle of claim 1, wherein the gyroscope is configured to measure a pitch, a roll, and a yaw of the vehicle.

4. The vehicle of claim 1, wherein the speed sensor is configured to measure the rate of travel independent of the multi-axis acceleration data measured by the accelerometer.

5. The vehicle of claim 1, wherein:
the vehicle comprises an on-board diagnostic system communicatively coupled with the detection device;
the on-board diagnostic system is configured to receive a status from one or more subsystems of the vehicle; and
the notification further includes the status received by the on-board diagnostic system.

6. A detection device for a vehicle, comprising:
a housing rigidly attached to a body of the vehicle, the body having kinetic energy management characteristics;
a receiver positioned at least partially within the housing and electrically coupled with the vehicle;
an accelerometer configured to measure acceleration along multiple axes of the vehicle;
a processing unit operatively coupled with the accelerometer and configured to:
continuously monitor multi-axis acceleration data from the accelerometer;
analyze data received using the accelerometer to determine that a crash event has occurred;
in response to determining that the crash event has occurred, generate a notification, the notification including multi-axis acceleration data corresponding to the crash event; and
a transmitter configured to output the notification for a remote server; wherein:
the remote server is configured to:
access vehicle-specific information corresponding to the vehicle;
determine, using the multi-axis acceleration data:
a crash force received by the vehicle during the crash event; and
a direction of the crash force received by the vehicle; and
compute estimated physical damage of the vehicle using the vehicle-specific information, the determined crash force, and the direction of the crash force.

7. The detection device of claim 6, wherein:
the vehicle is one of a group of vehicles; and
the detection device is interchangeable with any of the group of vehicles.

8. The detection device of claim of claim 6, wherein:
the detection device further comprises:
a gyroscope configured to measure angular velocity of the vehicle; and
a speed sensor configured to measure a rate of travel of the vehicle;
the notification further comprises angular velocity data of the gyroscope and rate of travel data of the speed sensor; and
the remote server is configured to determine the crash force and the direction of the crash force further using the angular velocity data and the rate of travel data.

9. A method for detecting and characterizing a crash event for a vehicle having energy management characteristics in near real-time, comprising:
continuously monitoring, using an accelerometer at the vehicle, acceleration data indicating acceleration along multiple axes of the vehicle;
continuously monitoring, using a gyroscope at the vehicle, angular velocity data indicating an angular velocity of the vehicle;
continuously monitoring, using a speed sensor at the vehicle, rate of travel data indicating a rate of travel of vehicle;
determining, using a detection device rigidly secured to the vehicle and the acceleration data, that the vehicle has been involved in a crash event:
transmitting, using the detection device, a notification to a remote server, the notification including the acceleration data, the angular velocity data, and the rate of travel data; and determining physical-damage characteristics of the vehicle, using a physical-damage module of the remote server, by:
  accessing vehicle-specific information corresponding to the vehicle using vehicle identification information received from the detection device;
  determining, using the acceleration data, the angular velocity data, and the rate of travel data:
    a crash force received by the vehicle during the crash event; and
    a direction of the crash force received by the vehicle; and
  computing estimated physical damage of the vehicle using the vehicle-specific information, the determined crash force, and the direction of the crash force.

10. The method of claim 9, further comprising:
in response to the crash event, transmitting, using the remote server, information corresponding to the crash event to a remote client device, the information corresponding to the crash event including one or more of:
  a location of the crash event;
  a time of the crash event;
  a date of the crash event;
  a type of the crash event;
  a severity of a crash event;
  physical-damage characteristics of the vehicle;
  occupant-injury characteristics; or
  a bill of materials comprising anticipated replacement parts for the vehicle.

11. The method of claim 10, further comprising:
generating the bill of materials, using a damage cost module of the remote server, by generating a list of damaged parts of the vehicle using the physical-damage characteristics.

12. The method of claim 10, further comprising:
determining the occupant-injury characteristics, using an injury probability module of the remote server, by estimating forces exerted on an occupant of the vehicle using:
  the crash force;
  the direction of the crash force; and
  information associated with the occupant in the vehicle, including seat belt usage or seat position.

* * * * *